US010173198B2

(12) United States Patent
Lowry et al.

(10) Patent No.: US 10,173,198 B2
(45) Date of Patent: Jan. 8, 2019

(54) TITANIA PARTICLES AND A PROCESS FOR THEIR PRODUCTION

(71) Applicant: Huntsman P&A UK Limited, Wynyard Park, Stockton-on-Tees (GB)

(72) Inventors: Karl Lowry, Stockton-on-Tees (GB); John Lalande Edwards, Durham (GB); Darren J Waters, Brotton (GB); John Robb, Stockton-on-Tees (GB)

(73) Assignee: HUNTSMAN P&A UK LIMITED, Wynyard Park, Stockton-on-Tees (GB)

( * ) Notice: Subject to any disclaimer, the term of this patent is extended or adjusted under 35 U.S.C. 154(b) by 0 days.

(21) Appl. No.: 15/023,918

(22) PCT Filed: Sep. 22, 2014

(86) PCT No.: PCT/GB2014/052878
§ 371 (c)(1),
(2) Date: Mar. 22, 2016

(87) PCT Pub. No.: WO2015/040426
PCT Pub. Date: Mar. 26, 2015

(65) Prior Publication Data
US 2016/0236174 A1    Aug. 18, 2016

(30) Foreign Application Priority Data

Sep. 23, 2013 (GB) .................................. 1316874.5
Aug. 27, 2014 (GB) .................................. 1415175.7

(51) Int. Cl.
*B01J 21/06* (2006.01)
*B01J 37/00* (2006.01)
(Continued)

(52) U.S. Cl.
CPC ............. *B01J 21/063* (2013.01); *B01J 23/48* (2013.01); *B01J 23/56* (2013.01); *B01J 23/70* (2013.01);
(Continued)

(58) Field of Classification Search
CPC .... B01J 37/0045; B01J 37/031; B01J 37/036; B01J 37/04; B01J 21/063
See application file for complete search history.

(56) References Cited

U.S. PATENT DOCUMENTS 3,018,186 A    1/1962  Jenkins
3,642,912 A *  2/1972  Dean et al. ............. C07C 37/16
                                                    502/350
(Continued)

FOREIGN PATENT DOCUMENTS

CN     101827650 A    9/2010
EP     1 657 219 A    5/2006
(Continued)

OTHER PUBLICATIONS

R. Lee Penn, Jillian F. Banfield; "Morphology Development and crystal growth in Nanocrystalline Aggregates under Hydrothermal Conditions : Insights from Titania", Geochimica and Cosmochimica Acta, vol. 63, No. 10, Jan. 18, 1999, pp. 1549-1557.
(Continued)

*Primary Examiner* — Cam N. Nguyen
(74) *Attorney, Agent, or Firm* — Norman B. Thot

(57) ABSTRACT

The invention provides a process for the production of titania particles with a desired morphology. The process comprises providing a titania sol and then drying the sol to provide dried titania particles. The process is characterized in that the morphology of the dried titania particles is controlled by applying one or more of the following criteria: (a) the titania sol is produced from a $TiO_2$ containing slurry
(Continued)

obtained using a precipitation step in a sulphate process, wherein the size of micelles formed during the precipitation is controlled; (b) the titania sol is produced from a $TiO_2$ containing slurry and the pH of the slurry is controlled in order to affect the extent to which the titania sol is flocculated; (c) the titania sol is produced from a $TiO_2$ containing slurry and the iso-electric point of the titania is adjusted in order to affect the extent to which the titania sol is flocculated; (d) the titania sol is dried by application of heat and the temperature used during the drying step is controlled.

11 Claims, 8 Drawing Sheets

(51) Int. Cl.
| | | |
|---|---|---|
| C01G 23/053 | (2006.01) | |
| C01G 23/08 | (2006.01) | |
| B01J 37/03 | (2006.01) | |
| B01J 23/48 | (2006.01) | |
| B01J 23/56 | (2006.01) | |
| B01J 23/70 | (2006.01) | |
| B01J 35/00 | (2006.01) | |
| B01J 35/10 | (2006.01) | |
| B01J 35/02 | (2006.01) | |
| B01J 37/04 | (2006.01) | |

(52) U.S. Cl.
CPC ......... B01J 35/0013 (2013.01); B01J 35/023 (2013.01); B01J 35/1014 (2013.01); B01J 35/1019 (2013.01); B01J 35/1038 (2013.01); B01J 35/1052 (2013.01); B01J 37/0045 (2013.01); B01J 37/031 (2013.01); B01J 37/036 (2013.01); B01J 37/04 (2013.01); C01G 23/053 (2013.01); C01G 23/0532 (2013.01); C01G 23/08 (2013.01); C01P 2004/03 (2013.01); C01P 2004/04 (2013.01); C01P 2004/61 (2013.01); C01P 2006/12 (2013.01); C01P 2006/16 (2013.01); C01P 2006/21 (2013.01)

(56) References Cited

U.S. PATENT DOCUMENTS

| | | | | |
|---|---|---|---|---|
| 4,166,147 A | * | 8/1979 | Lange | B01D 39/20 428/328 |
| 4,732,750 A | * | 3/1988 | Olson | C01G 23/053 423/608 |
| 5,128,291 A | * | 7/1992 | Wax | B01J 20/06 210/198.2 |
| 5,723,404 A | * | 3/1998 | Butje | B01D 53/8628 423/239.1 |
| 7,081,433 B2 | * | 7/2006 | Rolison | B01D 53/864 502/305 |
| 7,354,603 B2 | | 4/2008 | Bartle et al. | |
| 7,648,936 B2 | * | 1/2010 | Morales | B01J 23/44 502/242 |
| 7,763,565 B2 | | 7/2010 | Fu et al. | |
| 8,647,599 B2 | * | 2/2014 | Schimanski | B01J 21/08 423/335 |
| 8,906,711 B2 | * | 12/2014 | Mohammadi | B82Y 30/00 252/519.12 |
| 2006/0116282 A1 | | 6/2006 | Honda et al. | |
| 2009/0062111 A1 | | 3/2009 | Fu et al. | |
| 2011/0159109 A1 | * | 6/2011 | Lee | A61L 2/232 424/618 |
| 2012/0165186 A1 | | 6/2012 | Edwards et al. | |

FOREIGN PATENT DOCUMENTS

| | | |
|---|---|---|
| GB | 944 292 A | 12/1960 |
| WO | 2009/029856 A | 3/2009 |
| WO | 2011/033286 A | 3/2011 |

OTHER PUBLICATIONS

Jung Soo Kim, Soo Jung Kim Eun Gu Gung et al. "The Preparation of Titania Nano Crystals and Silivca-Titania Core-Shell Particles through Peptization Process", Journal of Processing Research, vol. 14, No. 3, Jan. 1, 2013, pp. 327-331.

Chen-Chi Wang, Jackie Y. Ying; "Sol-Gel Synthesis and Hydrothermal Processing of Anatase and Rutile Titania Nanocrystals", Chemistry of Materials, vol. 11, Oct. 29, 1999, pp. 3113-3120.

Li-Heng Kao, Tzu-Chien Hsu, Hong-Yang Lu; "Sol-Gel Synthesis and Morphological Control of Nanocrystalline TiO2 via Urea Treatment", Journal of Colloid and Interface Science, vol. 316, Aug. 1, 2007, pp. 160-167.

Limin Qi, "Synthesis of Inorganic Nanostructures in Reverse Micelles", Encyclopedia of Surface and Colloid Science, vol. 2, 2006, pp. 6183-6207.

Xiaobo Chen and Samuel S. Ma, "Titanium Dioxide Nanomaterials : Synthesis, Properties, Modifications and Applications", Chem. Rev., 2007, 107, 2891-2959.

Jun Ho Kim, et al., "Hydrothermal synthesis of titanium dioxides using basic peptizing agents and their photocatalytic activity", Chemical Engineering Science, vol. 62, 5154-5159, 2007.

Li Na "Study on Behavior of Nano TiO2 in Water Environment—Study on Dispersion and Sedimentation Behavior of Nano TiO2 in Water" China Master Dissertations Full-text database Engineering Technology, vol. I, No. 03, pp. 24-25, Mar. 15, 2013.

Shi Huijuan, et al. "PMMA-Templated Synthesis of Porous TiO2 Micro-Spheres and Application in Photocatalysis", Acta Chimica Sinica, vol. 69, No. 8, pp. 863-869, Dec. 31, 2011.

Text Portion of First Office Action of CN Application No. 201480051998.6, issued by the Chinese Patent Office dated Dec. 26, 2016.

\* cited by examiner

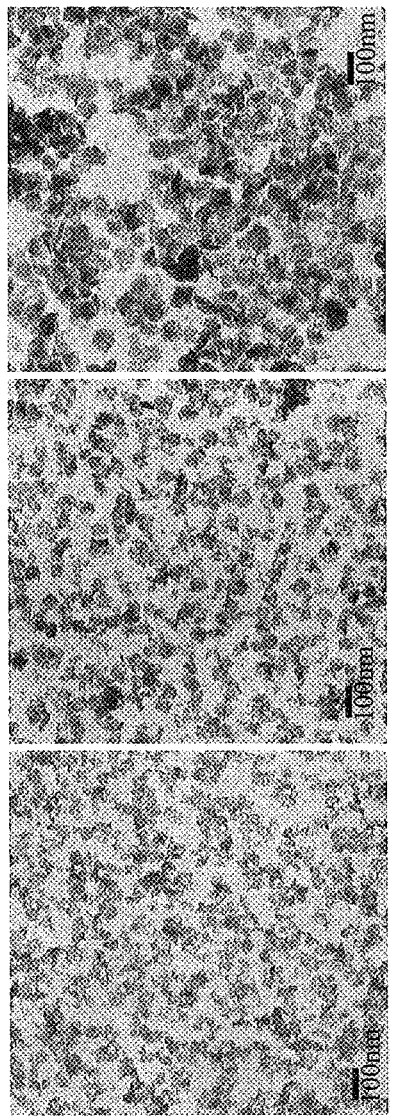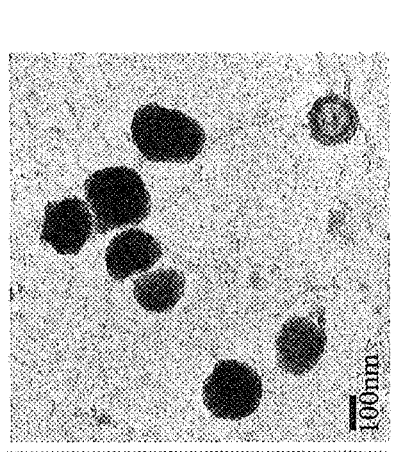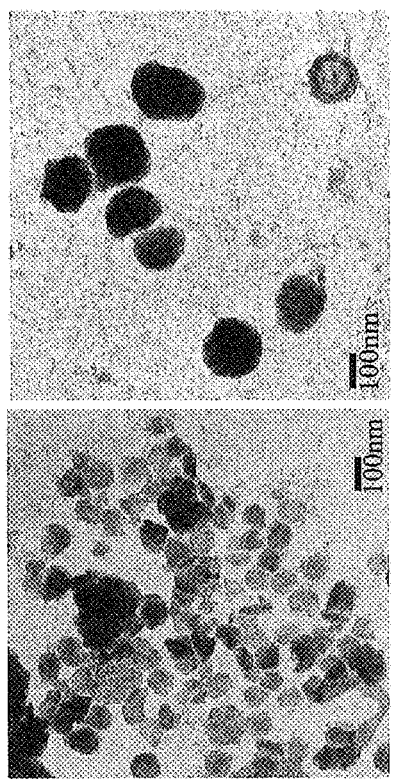

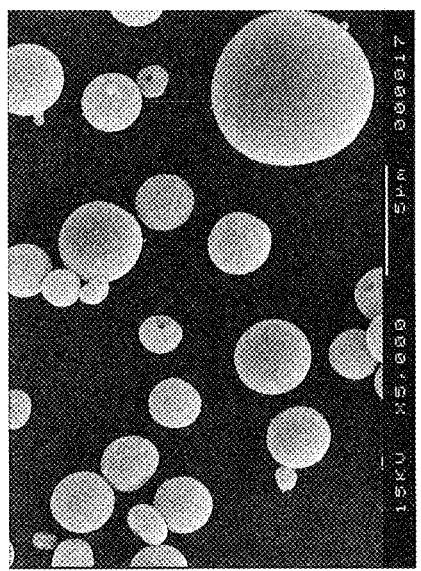
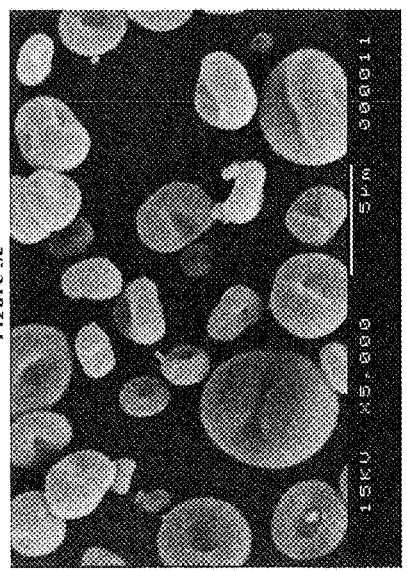
Figure 5a
Figure 5c
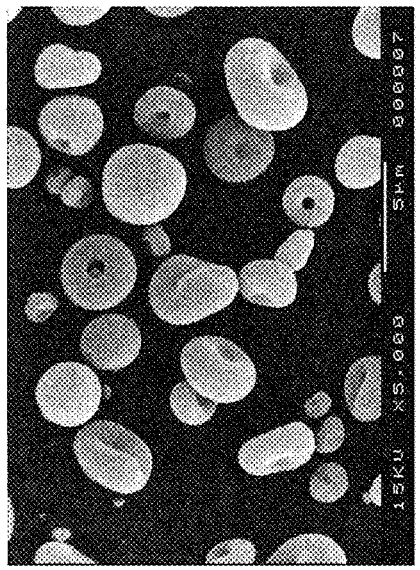
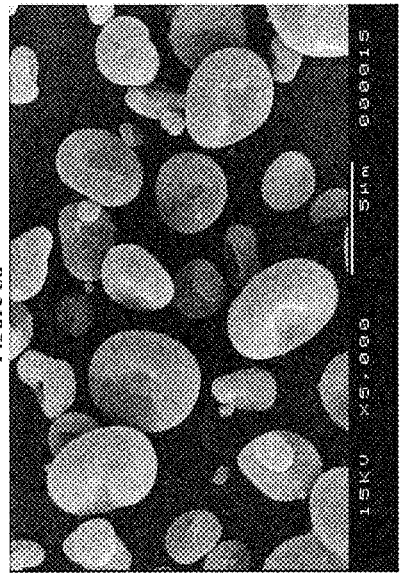
Figure 5b
Figure 5d

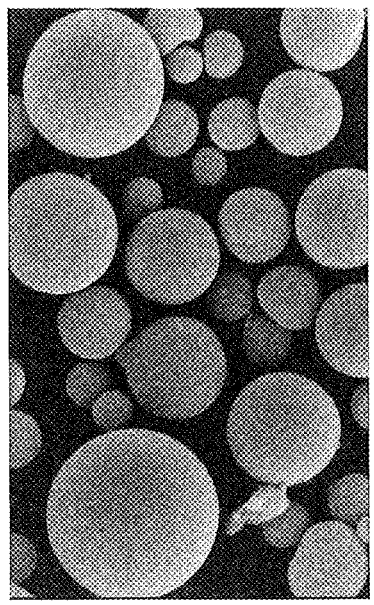
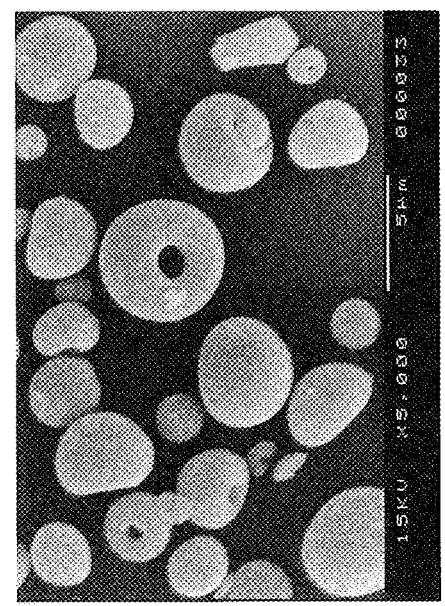
Figure 7a
Figure 7c
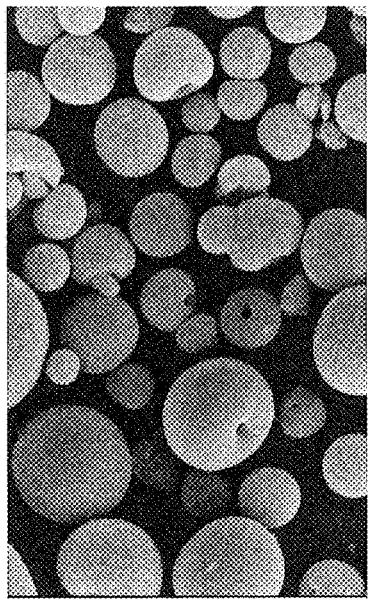
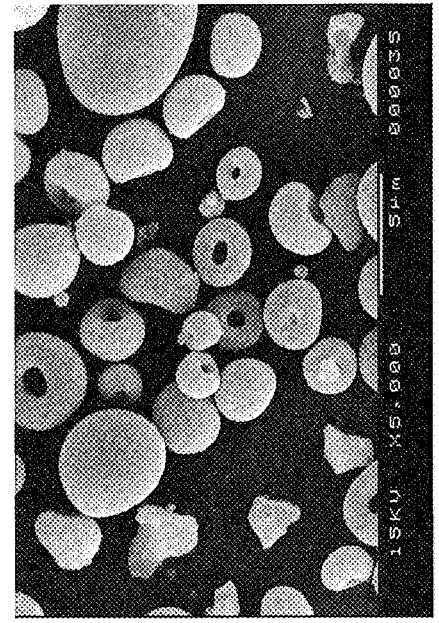
Figure 7b
Figure 7d

TITANIA PARTICLES AND A PROCESS FOR THEIR PRODUCTION

CROSS-REFERENCE TO RELATED APPLICATIONS

This application is the National Phase of International Application PCT/GB2014/052878 filed Sep. 22, 2014 which designated the U.S. and which claims priority to Great Britain App. Serial No. 1316874.5 filed Sep. 23, 2013 and Great Britain App. Serial No. 1415175.7 filed Aug. 27, 2014. The noted applications are incorporated herein by reference.

FIELD OF THE INVENTION

The invention relates, in general, to titania particles and to processes for their production and use.

BACKGROUND TO THE INVENTION

Titanium dioxide (titania) is well known and has a variety of applications, including cosmetics, personal care products, plastics, surface coatings, self-cleaning surfaces, drug delivery and medical devices, as a catalytic carrier material and in photovoltaic applications.

There are two main processes for making raw titanium dioxide: the sulfate process and the chloride process.

The sulfate process is based on the digestion of ilmenite or titania slag in concentrated sulfuric acid. After iron removal as iron sulfate, the solution is heated and diluted with water. The titanium hydrolyzes, forming a titanium oxysulfate precipitate, which is further treated to produce $TiO_2$ pigment.

The chloride process relies on carbochlorination of titanium containing ore or intermediate products to form $TiCl_4$, followed by the gas phase oxidation of $TiCl_4$.

Titanium dioxide can be flocculated and/or precipitated out of a slurry containing titanium dioxide by pH adjustment of the slurry.

The finishing process for titanium dioxide, as obtained by any known method, may include one or more of: drying, milling, filtering, washing, and packaging.

Many applications require the titania to have a large specific surface area (e.g. greater than 200 m$^2$/g), in order to increase efficacy. In particular this is due to the fact that such larger surface areas result in increased gas to solid contact ratios or increased liquid to solid contact ratios. Such large specific surface areas can be achieved by the use of nano particles of titania (i.e. particles with a diameter of less than 100 nm) and this is the current normal approach.

However, the use of nano materials has attracted publicity and concerns from some areas. In general, there has been much debate generated with regard to the environmental health and safety implications of nano materials.

There can also be applications where control of the surface area/porosity to be within certain ranges can be desired; the largest possible specific surface area is not always what is required.

There is also a desire for titania material that has a particle shape suited to the desired end use of the material. Dependent on the intended use, different shapes of particles may be more appropriate.

Thus it has been identified by the inventors that there is a clear need for methods that permit control of morphology (i.e. form and structure) when manufacturing titania particles. The morphology may in particular relate to the pore size in the titania particles (which in turn impacts on the specific surface area of the particles) and/or the shape of the titania particles (e.g. in terms of whether the particles are spherical in shape or present an alternative shape such as a toroid (i.e. a doughnut-type shape), and whether the particles are "fluffy" or have a smooth surface).

In this regard, it is particularly desired to be able to control porosity (and thus specific surface area) when manufacturing titania particles and/or to control particle shape when manufacturing titania particles, in order that particles having a suitable porosity and/or shape for the desired application can be prepared.

SUMMARY OF THE INVENTION

The invention provides, in a first aspect, a process for the production of titania particles with a desired morphology, the process comprising:
  providing a titania sol;
and then
  drying the sol to provide dried titania particles;
characterised in that the morphology of the dried titania particles is controlled by applying one or more of the following criteria:
  (a) the titania sol is produced from a $TiO_2$ containing slurry obtained using a precipitation step in a sulphate process, and the size of micelles formed during the precipitation is controlled,
  (b) the titania sol is produced from a $TiO_2$ containing slurry and the pH of the slurry is controlled in order to affect the extent to which the titania sol is flocculated,
  (c) the titania sol is produced from a $TiO_2$ containing slurry and the iso-electric point of the titania is adjusted in order to affect the extent to which the titania sol is flocculated;
  (d) the titania sol is dried by application of heat and the temperature used during the drying step is controlled.

In this regard, the morphology refers to the form and structure of the titania particles. The morphology includes, but is not limited to, the size of pores in the titania particles (which in turn impacts on the specific surface area of the particles) and the shape of the titania particles.

The invention provides, in one such aspect, a process for the production of titania particles with a desired morphology, the process comprising:
  providing a titania sol;
and then
  drying the sol to provide dried titania particles;
characterised in that:
(A) the pore size of the dried titania particles is controlled by applying one or more of the following criteria:
  (A-i) the titania sol is produced from $TiO_2$ containing slurry obtained using a precipitation step in a sulphate process, and the size of micelles formed during the precipitation is controlled,
  (A-ii) the titania sol is produced from a $TiO_2$ containing slurry and the pH of the slurry is controlled in order to affect the extent to which the titania sol is flocculated,
  (A-iii) the titania sol is produced from a $TiO_2$ containing slurry and the iso-electric point of the titania is adjusted in order to affect the extent to which the titania sol is flocculated;
and/or
(B) the shape of the dried titania particles is controlled by applying one or more of the following criteria:
  (B-i) the titania sol is produced from a $TiO_2$ containing slurry and the pH of the slurry is controlled in order to affect the extent to which the titania sol is flocculated, (B-ii) the titania sol is dried by application of heat and the temperature used during the drying step is controlled.

The invention also provides, in a second aspect, the use of a controlled nucleation during preparation of a titania sol by a precipitation step in a sulphate process, before then drying said sol, wherein the size of micelles formed during the precipitation is controlled so as to control the morphology of the resultant dried titania particles. Preferably, the precipitation is controlled so as to control the pore size and/or specific surface area of the resultant dried titania particles.

The invention also provides, in a third aspect, the use of a controlled flocculation during preparation of a titania sol from a titania slurry, before then drying said sol, wherein the extent to which the sol is flocculated is controlled by adjusting the pH of the slurry, so as to control the morphology of the resultant dried titania particles. Preferably, the flocculation is controlled so as to control the pore size and/or specific surface area and/or particle shape of the resultant dried titania particles. The pH may be adjusted to be closer to the iso-electric point of the titania, so there is a greater degree of flocculation, or the pH may be adjusted to be further from the iso-electric point of the titania, so there is a lesser degree of flocculation.

The invention also provides, in a fourth aspect, the use of a controlled flocculation during or after the formation of a titania sol, before then drying said sol, wherein the extent to which the sol is flocculated is controlled by adjusting the iso-electric point of the titania, so as to control the morphology of the resultant dried titania particles. Preferably, the flocculation is controlled so as to control the pore size and/or specific surface area of the resultant dried titania particles. The iso-electric point may be adjusted so as to be closer to the pH of the slurry/sol, so there is a greater degree of flocculation, or the iso-electric point may be adjusted to be further from the pH of the slurry/sol, so there is a lesser degree of flocculation.

The invention also provides, in a fifth aspect, the use of a controlled drying during preparation of dried titania particles from a titania sol, wherein the temperature used during the drying step is controlled so as to control the morphology of the resultant dried titania particles. Preferably, the temperature is controlled so as to control the particle shape of the resultant dried titania particles.

The invention therefore permits the formation of titania with desired morphology, e.g. in terms of desired pore size and/or desired particle shape. The invention may be practised on titania with a range of particle sizes, including nano, meso and macro particles.

It may, for example, be used to provide titania with large specific surface areas but which can be used in applications where there is a desire to avoid the need to use nano materials.

In a sixth aspect of the invention, a process for producing titania comprises:
providing a titania sol;
and then
spray drying the sol to provide dried titania particles;
characterised in that the morphology of the dried titania particles is controlled by:
(i) the titania sol being produced from a $TiO_2$ containing slurry and the pH of the slurry being controlled to be 3 pH units or more from the iso-electric point of the titania, by the addition of peptising agent, in order to reduce the extent to which the titania sol is flocculated; or
(ii) the titania sol being produced from a $TiO_2$ containing slurry and the iso-electric point being adjusted to be 3 pH units or more from the pH of the slurry, by the addition of dispersant, in order to reduce the extent to which the titania sol is flocculated.

This process is beneficial in that by controlling the pH during peptisation to be away from the iso-electric point (which will normally be at about pH 5-6), or by adjusting the iso-electric point to be away from the pH of the slurry, the sol will be fully dispersed (not flocculated). Following this with a spray drying treatment results in a particulate product that has a smooth curved outer surface, that is relatively small in size (particle diameter of 30 µm or less), and that has high integrity, being resistant to external forces including high shear mixing. The particles may be spherical or toroidal but have a continuous exterior curved (convex) surface.

In one embodiment, the pH of the slurry is adjusted to be 3.5 pH units or more, or 4 pH units or more, such as from 4 to 6 pH units, away from the iso-electric point of the titania, by the addition of peptising agent, in order to reduce the extent to which the titania sol is flocculated. The pH of the slurry is adjusted by the addition of any suitable peptising agent (examples of which are set out below). One suitable peptising agent is a monoprotic acid, such as hydrochloric acid, which will lower the pH and take it away from the iso-electric point.

In one embodiment, the iso-electric point of the titania is adjusted to be 3.5 pH units or more, or 4 pH units or more, such as from 4 to 6 pH units, away from the pH of the slurry, by the addition of a dispersant, in order to reduce the extent to which the titania sol is flocculated. The iso-electric point of the titania is adjusted by the addition of any suitable dispersant (examples of which are set out below). One suitable dispersant is an α-hydroxy carboxylic acid, such as citric acid.

In one embodiment, the process comprises:
providing a titania sol;
and then
spray drying the sol to provide dried titania particles;
characterised in that the morphology of the dried titania particles is controlled by:
the titania sol being produced from a $TiO_2$ containing slurry and the pH of the slurry being controlled to be in the range of from 1 to 3, by the addition of peptising agent, in order to the reduce the extent to which the titania sol is flocculated.

This process is beneficial in that by controlling the pH during peptisation to be low the sol will be fully dispersed (not flocculated). Following this with a spray drying treatment results in a particulate product that has a smooth curved outer surface, that is relatively small in size (particle diameter of 30 µm or less), and that has high integrity, being resistant to external forces including high shear mixing. The particles may be spherical or toroidal but have a continuous exterior curved (convex) surface.

In a preferred embodiment, the pH of the slurry is controlled to be in the range of from 1 to 2, especially from 1 to 1.5, by the addition of peptising agent, in order to the reduce/minimise the extent to which the titania sol is flocculated.

Although any peptising agent may be used, in one embodiment the pH of the slurry is controlled by the addition of hydrochloric acid, or another monoprotic acid, as peptising agent.

In the process of the sixth aspect, it may be that after the addition of dispersant/the addition of peptising agent, the sol is then neutralised (e.g. with monoisopropanolamine—known as MIPA). Excess soluble salts may be removed to a desired conductivity, e.g. using cross-flow filtration, for example the washing may reduce the conductivity to <2 ms/cm.

It may be that the morphology of the dried titania particles is further controlled by the temperature used during the spray drying step being controlled; in one such embodiment the temperature of spray drying is controlled to be in the range of from 50 to 150° C., such as from 75 to 140° C., or from 100 to 125° C. This further assists in the production of small strong particles, which are preferably spherical.

The sol as spray dried may in one embodiment have a solids content of from 1% to 35% wt/wt, e.g. from 2 to 25% wt/wt or from 5 to 20% wt/wt or from 10 to 18% wt/wt.

It may be that the morphology of the dried titania particles is further controlled by the titania sol being produced from a $TiO_2$ containing slurry obtained using a precipitation step in a sulphate process, wherein the size of micelles formed during the precipitation is controlled to be in the range of 10 to 150 nm, such as from 15 to 125 nm, or from 20 to 100 nm.

It may be suitably that the size of micelles formed during the precipitation is controlled to be in the range of from 20 to 50 nm. For example, in one embodiment they may be sized from 20 to 45 nm or from 20 to 40 nm or from 25 to 45 nm or from 25 to 40 nm.

In one such embodiment the size of micelles formed during the precipitation is controlled by the use of a Mecklenburg precipitation with a nucleation level in the range of from 0.1 to 15 wt %, e.g. of from 1 to 15 wt %, or from 5 to 12 wt %.

It may be suitably that the nucleation level is from 5 to 10 wt %, such as from 5.5 to 9 wt %, and especially in the range of from 6 to 8 wt %.

In another such embodiment the size of micelles formed during the precipitation is controlled by the use of a Blumenfeld precipitation with a drop ratio of from 50:50 to 99:1, e.g. from 50:50 to 80:20 or from 50:50 to 78:22 or from 50:50 to 75:25 (such as from 60:40 to 75:25) or from 80:20 to 98:2 or from 82:18 to 98:2 (such as from 85:15 to 98:2).

It may suitably be that the drop ratio is in the range of from 50:50 to 75:25 or from 50:50 to 70:30, e.g. from 55:45 to 75:25, such as from 60:40 to 75:25 or from 55:45 to 70:30.

Therefore the invention also provides, in a seventh aspect, titania in the form of particles that are obtainable by the process of the sixth aspect of the invention.

In particular, these particles as obtainable by this process each have a continuous exterior convex surface, the particles having a diameter, as measured by using laser diffraction, of 30 μm or less, and a BET specific surface area of 50 m²/g or more, wherein the particles are porous.

Preferably the particles are spherical in shape or toroidal in shape.

Preferably the particles have a diameter, as measured by using laser diffraction, of 20 μm or less, such as from 2 to 20 μm.

Preferably the particles have a BET specific surface area of 80 m²/g or more, such as from 80 to 320 m²/g.

The particles of the seventh aspect are beneficial in that they have high integrity, being resistant to external forces, including high shear mixing. This high integrity is preserved even after heat treatment (e.g. after being thermally treated at 500° C. for 7 days), as is shown in the examples.

Therefore these novel particles have the ability to retain their size and shape even when exposed to a high level of external force.

These novel particles may, in an eighth aspect, be used as a catalyst or as a catalytic support. They may in particular be used as a catalyst or as a catalytic support where that catalyst or catalytic support is produced by a method that involves exposure to external forces, e.g. extrusion or high shear mixing.

In this regard, it may be that the porous titania of the seventh aspect is mixed with a binder and extruded to create high surface area titania pellets for use as a catalyst or catalyst support. If the titania is to be used as a support, it may be a support for any catalytic material. The catalytic material may, however, suitably be selected from the group consisting of: ruthenium, rhodium, palladium, iridium, platinum, osmium, iron, cobalt, nickel, copper, silver, vanadium, tungsten, chromium and molybdenum, and combinations thereof.

In one embodiment, the titania may be coated with silica or the like to provide improved thermal stability.

In one embodiment, the porous titania particles or extrudate formed therefrom may undergo an impregnation process, whereby catalytic promoters (such as molybdenum, nickel, cobalt, or a mixture thereof) are impregnated into the pores of the porous titania.

In one embodiment, a thermal stabiliser (such as tungsten trioxide from a precursor such as ammonium metatungstate or ammonium paratungstate, lanthanum oxide from a precursor such as lanthanum nitrate hexahydrate, cerium oxide from a precursor such as cerium nitrate hexahydrate, or silica from a precursor such as silicic acid) is incorporated. This can act to improve catalyst performance by maintaining a high BET surface area at elevated temperatures.

In one preferred embodiment the titania particles of the seventh aspect (or an extrudate formed therefrom) are used as a catalyst or as a catalytic support in an application selected from the group consisting of: emissions catalysis; catalysis of industrial chemical reactions; and photocatalysis. In one embodiment the particles (or an extrudate formed therefrom) are used as a catalyst or as a catalytic support in an application selected from the group consisting of: selective catalytic reduction of nitrogen-based gases (including in combined diesel particle filter/selective catalytic reduction units); desulphurisation of gases in the petroleum industry by the Claus process; and photocatalytic cleaning, purification or disinfection.

It is particularly beneficial to use the particles in emissions catalysis and especially selective catalytic reduction (SCR). There are two main manufacturing processes used in relation to SCR: i) an extruded ceramic product is prepared, which is made from a carrier based on titania, alumina and/or zeolites, with the active catalysts being mixed into the carrier prior to extruding; and ii) a ceramic or metal product is prepared, which is then dipped into a slurry containing titania and active catalysts, which is then dried; this is known as a washcoat. In either case the product has a "honeycomb" form.

Good strength properties and robustness may be particularly important when titania particles are used in an SCR manufacturing process that uses an extrusion processes.

Therefore in one embodiment the novel particles of the seventh aspect are extruded under high pressure, through extrusion dies, to produce a catalytic product suitable for use in exhaust systems.

One or more active catalysts are mixed into the carrier prior to extruding. Active catalysts may suitably be selected from the group consisting of: ruthenium, rhodium, palladium, iridium, platinum, osmium, iron, cobalt, nickel, copper, silver, vanadium, tungsten, chromium and molybdenum, and combinations thereof. In the field of emissions catalysts, platinum, palladium, tungsten and/or vanadium tend to be preferred. In one embodiment, the catalyst is platinum and/or vanadium.

The novel particles of the seventh aspect may be mixed with any other desired materials (e.g. other carrier or support materials, or binder materials), before extrusion. In one embodiment, the particles may be mixed with a cordierite and a binder as well as with active catalyst material before then being extruded to form a catalyst product.

The strength characteristics of the novel particles of the seventh aspect mean that they are less likely to collapse under external forces, e.g. high pressures. Therefore they retain their shape, size and porosity characteristics. Known porous products may, in contrast, be found to exhibit some degree of collapse or reduction in pore size under pressure.

Accordingly, in a ninth aspect of the invention, a process for preparing a catalyst product is provided, the process comprising the steps of:

providing dried titania particles according to the seventh aspect;
mixing the particles with active catalyst material;
extruding the mixture under pressure, through extrusion dies, to produce a catalyst product.

The active catalyst material may be one or more active catalysts, preferably selected from those discussed above in relation to the eighth aspect.

In one embodiment, the process also includes the step of mixing the particles with other carrier or support materials (e.g. ceramics, such as alumina or cordierite, or zeolites) and/or binder materials. This may be carried out before or after the step of mixing the particles with active catalyst material, but must be carried out before the extrusion step.

In one embodiment, the step of providing dried titania particles according to the seventh aspect is carried out by carrying out the process of the sixth aspect.

The catalyst product made by the process of the ninth aspect is particularly suitable for use in exhaust systems. Due to the improved robustness of the titania particles in the product, the catalyst product has improved catalytic properties, because the titania particles retain their porosity even after the extrusion process involved in the manufacturing process. As will be appreciated by the skilled reader, improved porosity for the carrier/support is influential on the properties of a catalyst product.

In a tenth aspect, therefore, there is provided a catalyst product comprising titania and catalyst material, the catalyst product being obtainable by the process of the ninth aspect.

DETAILED DESCRIPTION OF THE INVENTION

The present invention permits the control of the morphology of titania particles, both in terms of the overall shape of the particles (e.g. spherical or toroidal, smooth outer surface or rough outer surface, dense or hollow) and in terms of pore size (which in turn will impact on the specific surface area).

Although the present invention can be applied to titania particles of any size, as noted above there are issues surrounding use of nano materials in some areas and there is a desire for an alternative titania material that has a large specific surface area. Accordingly, in some embodiments the titania particles may be sized so as to be larger than nanoparticles, e.g. they may be meso or macro particles. In some embodiments the titania particles may have a particle size of greater than 0.1 μm.

The titania particles of the invention may suitably have a particle size of greater than 0.15 μm, e.g. of 0.2 μm or more, 0.3 μm or more, 0.4 μm or more, 0.5 μm or more, 0.6 μm or more, 0.7 μm or more, 0.8 μm or more, or 0.9 μm or more. In some embodiments the particle size is 1.0 μm or more, such as 1.1 μm or more, 1.2 μm or more, 1.3 μm or more, 1.4 μm or more, 1.5 μm or more, 1.6 μm or more, 1.7 μm or more, 1.8 μm or more, or 1.9 μm or more. The particle size may be 2.0 μm or more.

In some embodiments the titania particles may have a particle size of from 0.2 μm to 15 μm, such as from 0.5 μm to 12 μm, e.g. from 0.7 μm to 10 μm or from 0.8 μm to 8 μm, such as from 1 μm to 6 μm or from 1.5 μm to 5 lim or from 2 μm to 4 μm.

The particle size is a geometric weight mean value for the particle size (appropriate for the approximately log normal distribution which is often found with such particles).

The particle size may alternatively be determined by laser diffraction and may be measured using a laser diffraction machine, such as those available from Malvern Instruments Ltd, e.g. a MasterSizer machine.

The particle size may alternatively be determined by X-ray sedimentation and may be measured using a X-ray disc centrifuge, such as those available from Brookhaven, e.g. a BI-XDC machine.

As one skilled in the art is aware, crystal size is distinct from particle size. Crystal size relates to the size of the fundamental crystal units having internally consistent lattice planes, which make up the particulate material. Conventional manufacturing processes that manufacture titanium dioxide as a pigment will generate crystallites during a precipitation process; these are considered fundamental particles and are generally accepted to be in the order of 100 Å. During the precipitation process, the crystallites self-assemble into "rafts" known as micelles. These are lenticular in shape and generally have an aspect ratio of about 3:1, having a major axis of about 350 Å for rutile and about 600 Å for anatase. Conventional manufacturing processes that manufacture titanium dioxide as a pigment will incorporate a thermal processing step that causes the crystal centres of these crystallites to combine and create much larger crystals.

For example, conventional titanium dioxide product in a rutile crystal form has a crystal size of about 0.17 μm-0.29 μm and a particle size of about 0.25 μm-0.40 μm while conventional titanium dioxide product in an anatase crystal form has a crystal size of about 0.10 μm-0.25 μm and a particle size of about 0.20 μm-0.40 μm. The particle size is thus affected by factors such as the crystal size and incomplete fusion of crystals—as well as milling techniques used during production, such as dry, wet or incorporative milling, and subsequent treatments that cause aggregation of crystals.

The crystal size and particle size of the titanium dioxide may be determined by methods well known to those skilled in the art. For example, the crystal size may be determined by transmission electron microscopy on a rubbed out sample with image analysis of the resulting photograph. The results of the crystal size may further be validated by reference using latex NANOSHPHERE™ Size Standards (available from Thermo Scientific). As noted above, a method which may be used for determining the particle size of the titanium dioxide is laser diffraction. X-ray sedimentation may be used as an alternative.

The particle size of the titanium dioxide may therefore be greater than or about equal to the crystal size.

In general, to produce titanium dioxide, natural ores (such as ilmenite and mineral rutile), enriched ores (such as titanium slag and beneficiated ilmenite), or mixtures thereof may be used as the starting raw material. These ores may be processed by any suitable means, such as the sulphate process or the chloride process, to produce titanium dioxide crystallites and micelles of a required purity and size. This is known in the art and is conventional. It will be appreciated that the titanium dioxide as provided in sol form in the process of the invention can, on the whole, be obtained by any suitable technique and the invention is not limited to any method of manufacture. However, it may be preferred to use the sulphate process as this then permits the use of a controlled nucleation during preparation of the titania sol by a Mecklenburg, Blumenfeld or other precipitation step in this sulphate process.

One or more of the conditions discussed above may be controlled in order to select the pore diameters of the titania particles (i.e. the actual pores within the particles themselves, as compared to the packing between particles or the pores within the micelles that make up the particles). Preferably, the titania particles of the invention may have pore diameters which are greater than 2 nm.

In one embodiment, the titania particles are mesoporous, having pore diameters which are greater than 2 nm but less than 50 nm, e.g. from 3 nm to 45 nm or from 5 nm to 40 nm.

In other embodiments, the titania particles are macroporous, having pore diameters which are 50 nm or greater, e.g. from 50 nm up to 1000 nm or from 50 nm to 500 nm.

It may be desired to control the pore diameters to be from 4 nm to 50 nm, e.g. from 5 nm to 50 nm or from 10 nm to 50 nm, such as from 20 nm to 45 nm or from 25 nm to 40 nm.

Pore diameter may be measured using mercury porosimetry (for a pore diameter range of about 3 nm up to 200 μm), e.g. using a Micromeritics AutoPore IV porosimeter, and/or by nitrogen isotherms (for pore diameters in the nanometer range), e.g. using a Micromeritics TriStar 3020™ machine.

One or more of the conditions discussed above may be controlled in order to select the specific surface area of the titania particles. Preferably, the titania particles of the invention may have a specific surface area which is greater than 100 $m^2/g$.

The titania particles of the invention may have a specific surface area of greater than 125 $m^2/g$, e.g. of 150 $m^2/g$ or higher or 175 $m^2/g$ or higher. In one embodiment, they have a specific surface area of 200 $m^2/g$ or higher, such as 210 $m^2/g$ or higher, or 220 $m^2/g$ or higher, or 225 $m^2/g$ or higher.

In one embodiment, they have a specific surface area of 230 $m^2/g$ or higher, such as 235 $m^2/g$ or higher, or 245 $m^2/g$ or higher or 250 $m^2/g$ or higher. It may be that the titania particles have a specific surface area of 260 $m^2/g$ or higher, or 270 $m^2/g$ or higher, or 275 $m^2/g$ or higher, or 280 $m^2/g$ or higher, or 290 $m^2/g$ or higher. It may even be that the titania particles of the invention have a specific surface area of greater than 300 $m^2/g$.

There is no particular upper limit to the specific surface area for the titania particles of the invention, but in one embodiment it is up to 350 $m^2/g$, or up to 400 $m^2/g$, or up to 450 $m^2/g$, or up to 500 $m^2/g$. This may for example, apply in an embodiment where the crystal size is about is 4 nm.

The specific surface area may be determined using the Brunauer, Emmett and Teller method (BET method) as described in J. Am. Chem. Soc., 1938, 60, 309.

One or more of the conditions discussed above may be controlled in order to control the shapes of the titania particles. It may be that the titania particles of the invention have shapes that are spherical, or it may be that the shapes are ellipsoids (e.g. a prolate (elongated) spheroid or an oblate (flattened) spheroid), or it may be that the shapes are toroidal (doughnut-shaped), or they may appear cotton-wool like or fluffy. It may be that the titania particles of the invention have smooth outer surfaces or the outer surfaces may be rough. It may be that the titania particles of the invention are dense or they may be hollow.

The processes provided for forming the titania particles firstly involve the provision of a titania sol. A titania sol is a colloidal suspension of $TiO_2$ particles. The $TiO_2$ particles used may be anatase, rutile or amorphous or a mixture thereof.

As will be well understood by the skilled person, a sol is a colloidal suspension of solid particles in a liquid. In this regard, a colloid is a suspension of particles whereby the particle size is small enough so as not to be affected by gravitational forces and so the particles remain suspended over an extended period of time under standard conditions, e.g. for a day or more, a week or more, or a month or more (such as a year or more) at room temperature and pressure.

The liquid in which the titanium dioxide particles are provided is preferably polar. In one embodiment, the liquid is aqueous; this may be water or an aqueous solution. However other polar carriers for the particles could also be contemplated, e.g. they may be selected from polar organic solvents or alcohols. The liquid carrier may also be a mixture of two or more polar carriers, e.g., it may be a mixture of water and alcohol.

The titania particles in the titania sol may be derived from any suitable precursor. In one embodiment, they are derived from a titanium dioxide obtained from a sulphate manufacturing process (e.g. a Mecklenburg or Blumenfeld precipitation). They may, in one embodiment, be derived from a titanium dioxide obtained from a titanium oxysulphate precursor.

In one embodiment, the titania sol is produced from $TiO_2$ prepared by a precipitation step in a sulphate process (e.g. a Mecklenburg or Blumenfeld precipitation).

After precipitation, the obtained titania hydrate may be filtered, washed free of impurities, and contacted with an aqueous base to form a suspension having a pH of about neutral.

Sulphate ions can then be removed from the neutralized suspension by filtration and washing. It may be that the filter cake obtained after filtration is washed until the $SO_4^{2-}$ content of the wash filtrate is less than 0.1 g/l (which may be determined by barium chloride solution titration).

The filter cake is then slurried in water to produce an aqueous suspension of titania hydrate. This can then be peptized with acid pH adjustment (e.g. with a strong monoprotic acid pH adjustment) to provide the nano titania sol.

In one preferred embodiment, the titania sol that is provided is a concentrated, neutral titania sol made in accordance with the process described in WO2011/033286.

In one embodiment the titania sol that is provided has been obtained by preparing a pulp via a sulphate process (e.g. with a Mecklenburg or Blumenfeld precipitation). Said pulp is then neutralised (e.g. with aqueous ammonia). Optionally, the material is washed free from sulphates. The slurry is then peptised (e.g. using hydrochloric acid).

Optionally, the iso-electric point of the titania is lowered (e.g. with the addition of citric acid). The slurry may then be neutralised (e.g. with monoisopropanolamine).

Excess soluble salts may then be removed to a desired conductivity, e.g. using cross-flow filtration, followed by water removal to concentrate the sol.

It will be appreciated that the present invention is based around the ability to control the pore size in the particles and the ability to control the shape of the particles, to obtain a particulate product that has characteristics suitable for a given end use. The factors to be controlled in the present invention are described in more detail below:

Controlled Nucleation During Preparation of a Titania Sol by a Sulphate Precipitation Step As the skilled person will appreciate, micelles are the fundamental structural units of titania manufactured from the sulphate process. During the sulphate process crystallites precipitate out from a titanium and sulphuric acid solution; these are of the order of 100 Å in diameter. The micelles are then formed by these crystallites being bound together by sulphate ions and water; usually these stable micelles are formed from hundreds of crystallites. The micelles are lenticular in shape and the major axis is usually sized of the order of 600 Å.

The size of the micelles created at precipitation may be controlled by varying the level of nuclei used in the process for preparing the sol. As the skilled person will understand, in the Mecklenburg process nucleation involves seeding the sol during precipitation with nuclei, which are finely sized titania particles, to initiate or enhance crystal growth. In the Blumenfeld process, self nucleation occurs, and the conditions are controlled to impact the extent of self nucleation. Other precipitation methods are also known and during these precipitation methods the size of the micelles can likewise be controlled.

It is generally accepted that each micelle contains one nucleus and that the number of micelles remains constant during precipitation. In the Mecklenburg process, the number of micelles is a function of the number of nucleating sites introduced. As $TiO_2$ is precipitated, the ultimate size of the micelle is therefore also a function of the number of nucleating sites: the more nucleating sites available, the smaller the final micelles. These micelle particles will then flocculate into larger, less well defined particles in a standard precipitation; these are generally in the order of up to ~2 μm in a standard sulphate process precipitation.

In the Blumenfeld process, the nucleating sites develop spontaneously; aqueous $TiOSO_4$ (referenced as the "$TiOSO_4$-containing liquor") is introduced at a carefully controlled rate into a volume of water (referenced as the "foot water") that is initially large in volume in comparison with the volume of the added $TiOSO_4$ solution ($TiOSO_4$-containing liquor). At this point, there is initially a high water concentration, which drives the reaction

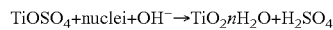

$$TiOSO_4 + nuclei + OH^- \rightarrow TiO_2 \cdot nH_2O + H_2SO_4$$

to the right and so promotes the nucleation of anatase. As further addition of aqueous $TiOSO_4$ continues, hydrolysis of $TiO_2$ is stopped due to increasing acid concentration; and the reaction is then driven to the left. When all the aqueous $TiOSO_4$ has been introduced, there will be sufficient nuclei to continue the precipitation.

Two variables influence the number of nucleating sites; these are:
  i) The ratio of the volume of the $TiOSO_4$-containing liquor to the foot water, known as the 'drop ratio'.
  ii) The time taken to completely introduce the required volume of the $TiOSO_4$ containing liquor to the foot water, known as the 'drop time'.

In the present invention, it has been determined that by controlling the drop ratio it is possible to grow micelles in a Blumenfeld precipitation in the same size range as that of a Mecklenburg precipitation (where nuclei level can be changed by changing the volume of nuclei added).

Where a process is used other than Mecklenburg or Blumenfeld, the process should be analysed to determine if nuclei are created in situ or ex situ. Where nucleation is ex situ, smaller pores will result from use of greater quantities of nuclei. Where nucleation is in situ, the reaction time may be shortened or the dilution increased, to reduce pore size.

In one preferred embodiment, the nano titania sol that is provided is one where the precipitated titania micelles have been controlled so as to be sized from 10 to 150 nm or more, (e.g. from 10 to 200 nm) such as from 15 to 125 nm, or from 20 to 100 nm. In one such embodiment, the nano titania sol that is provided is one where the precipitated titania micelles have been controlled so as to be sized from 10 to 60 nm, such as from 15 to 55 nm, and preferably from 20 to 50 nm. For example, they may be sized from 20 to 45 nm or from 20 to 40 nm or from 25 to 45 nm or from 25 to 40 nm.

The larger the micelles, the higher the pore size in the resultant titania particles.

Micelle size can be controlled in the Mecklenburg process by controlling the nucleation level. In this regard, a lower level of nuclei gives larger micelles.

In one embodiment, the sol is prepared with a nucleation level of 0.1 wt % or higher, such as 0.5 wt % or higher. In one embodiment, the sol is prepared with a nucleation level of 15 wt % or less. In one embodiment, the sol is prepared with a nucleation level of from 1 to 15 wt %.

By controlling the nucleation level to be at the lower end of the range, e.g. from 0.1 to 5 wt %, or from 0.3 to 4.5 wt %, or from 0.5 to 4 wt %, or from 0.7 to 3.5 wt %, or from 1 to 3 wt %, larger micelles are obtained and thus a higher pore size (diameter).

By controlling the nucleation level to be at the higher end of the range, e.g. from 5 to 15 wt %, or from 5 to 12 wt %, or from 5.5 to 10 wt %, or from 6 to 8 wt %, smaller micelles are obtained and thus a smaller pore size (diameter).

As noted above, micelle size can be controlled in the Blumenfeld process by varying the drop ratio. An increased drop ratio gives larger micelles.

In one embodiment, the sol is prepared using a drop ratio (ratio of liquor to water used by volume) of 50:50 or higher, such as 60:40 or higher. In one embodiment, the sol is prepared using a drop ratio of 99:1 or less. In one embodiment, the sol is prepared using a drop ratio of from 50:50 to 99:1.

In one embodiment, the drop ratio is controlled to be from about 60:40 to 99:1.

By controlling the drop ratio to be at the lower end of the range, e.g. from 50:50 to 80:20, or from 50:50 to 78:22, or from 50:50 to 75:25, or from 60:40 to 75:25, or from 70:30 to 75:25, smaller micelles are obtained and thus a smaller pore size (diameter). In one embodiment, the drop ratio is controlled to be from about 60:40 to 80:20.

By controlling the drop ratio to be at the higher end of the range, e.g. from 80:20 to 98:2, or from 82:18 to 98:2, or from 82:18 to 95:5, or from 85:15 to 98:2, or from 85:15 to 95:5, larger micelles are obtained and thus a higher pore size (diameter). In one embodiment, the drop ratio is controlled to be from about 80:20 to 95:5.

Controlled Flocculation by pH Control

When the titania sol is produced from a $TiO_2$ containing slurry the pH of the slurry can be controlled in order to the affect the extent to which the titania sol is flocculated.

In using this feature, the nano titania sol used in the process is flocculated, such that the sol as provided for drying is flocculated to a desired extent. As discussed below, the flocculation can be controlled so as to control the pore size and/or specific surface area and/or particle shape of the resultant dried titania particles.

The pH may be adjusted to be closer to the iso-electric point of the titania, so there is a greater degree of flocculation, or the pH may be adjusted to be further from the iso-electric point of the titania, so there is a lesser degree of flocculation.

The iso-electric point is normally at a pH of from 5 to 6.

The pH adjustment may be effected using acid (to lower the pH) or using base (to raise the pH).

For example, a strong monoprotic acid may be used, e.g. a monoprotic acid that has a pKa less than or equal to −1.0, especially one having a pKa less than or equal to −1.5, and in one embodiment having a pKa less than or equal to −1.74. Examples of acids that may be used include hydrochloric acid, hydrobromic acid and nitric acid. Preferably hydrochloric acid is used.

In another embodiment, a strong monoprotic base may be used, e.g. a monoprotic base that has a pKb less than or equal to 1.0, especially one having a pKb less than or equal to 0.5, and in one embodiment having a pKa less than or equal to 0.3. Examples of bases that may be used include sodium hydroxide and potassium hydroxide.

Therefore in the controlled flocculation of the present invention, acid or base may be added in a controlled manner such that the pH is adjusted to be close to the iso-electric point or away from the iso-electric point.

When the pH is adjusted to be close to the iso-electric point, the slurry is less dispersed (more flocculated). This leads towards larger pore sizes. It also leads towards particles that have a rough outer surface and that appear "fluffy". Thus in one embodiment, if such characteristics are desired, the pH can suitably be adjusted to be in the range of from 4 to 7, preferably from 4.5 to 6.5, such as from 5 to 6.

In one embodiment the pH is adjusted to be within 2.5 pH units of the iso-electric point, preferably within 2 pH units, more preferably within 1.5 pH units, and most preferably within 1 pH unit of the iso-electric point, so as to obtain larger pore sizes and/or to obtain particles that have a rough outer surface and that appear "fluffy".

When the pH is adjusted to be away from the iso-electric point, the slurry is more dispersed (less flocculated). This leads towards smaller pore sizes. It also leads towards particles that have a smooth outer surface and that are either toroidal or spherical. Thus in one embodiment if such characteristics are desired, the pH can be adjusted to be in the range of from 0.5 to 4, preferably from 1 to 3.5, or from 1 to 3, such as from 1.5 to 3. Alternatively, the pH can be adjusted to be in the range of from 7 to 12, preferably from 7.5 to 11.5, such as from 8 to 11.

In one embodiment the pH is adjusted to be 3 pH units or more from the iso-electric point, preferably 3.5 pH units or more from the iso-electric point, more preferably 4 pH units or more from the iso-electric point, and most preferably 4.5 pH units or more, such as 5 units or more, or 5.5 units or more, from the iso-electric point, so as to obtain smaller pore sizes and/or to obtain particles that have a smooth outer surface and that are either toroidal or spherical.

During formation of a titania sol it is known to peptise the slurry. This is carried out using acid, especially a strong monoprotic acid, e.g. a monoprotic acid that has a pKa less than or equal to −1.0, especially one having a pKa less than or equal to −1.5, and in one embodiment having a pKa less than or equal to −1.74.

Examples of acids that may be used for peptisation include hydrochloric acid, hydrobromic acid and nitric acid. Preferably hydrochloric acid is used.

Therefore in one embodiment of the controlled flocculation of the present invention, this peptisation step may be carried out in a controlled manner such that the pH is adjusted either to be closer to the iso-electric point or to be away from the iso-electric point.

Controlled Flocculation by Iso-Electric Point Control

When the titania sol is produced from a $TiO_2$ containing slurry the iso-electric point of the titania can be controlled in order to the affect the extent to which the titania sol is flocculated.

In using this feature, the nano titania sol used in the process is flocculated, such that the sol as provided for drying is flocculated to a desired extent. The flocculation may occur during the formation of the sol or after its formation. However, the sol as provided for drying must be flocculated.

As discussed below, the flocculation can be controlled so as to control the pore size and/or specific surface area and/or particle shape of the resultant dried titania particles.

The iso-electric point may be adjusted so as to be closer to the pH of the slurry/sol, so there is a greater degree of flocculation, or the iso-electric point may be adjusted to be further from the pH of the slurry/sol, so there is a lesser degree of flocculation.

The iso-electric point is normally at a pH of from 5 to 6. However, this iso-electric point can be adjusted, e.g. by the addition of a dispersant, which can raise or lower the iso-electric point.

It may be that the iso-electric point is adjusted before, during or after the peptisation stage of sol formation. In one embodiment, this adjustment may be carried out at the peptisation stage of sol formation.

When the iso-electric point is adjusted to be close to the pH, the slurry is less dispersed (more flocculated). This leads towards larger pore sizes. It also leads towards particles that have a rough outer surface and that appear "fluffy".

Therefore it may be that in one embodiment the iso-electric point is adjusted to be within 3 pH units of the pH, preferably within 2.5 pH units, more preferably within 2 pH units, e.g. within 1.5 units, and most preferably within 1 pH unit of the pH, so as to obtain larger pore sizes and/or to obtain particles that have a rough outer surface and that appear "fluffy".

When the iso-electric point is adjusted to be away from the pH, the slurry is more dispersed (less flocculated). This leads towards smaller pore sizes. It also leads towards particles that have a smooth outer surface and that are either toroidal or spherical.

Therefore it may be that in one embodiment the iso-electric point is adjusted to be 3 pH units or more from the pH, preferably 3.5 pH units or more from the pH, more preferably 4 pH units or more from the pH, and most preferably 4.5 pH units or more, such as 5 units or more, or 5.5 units or more, from the pH, so as to obtain smaller pore sizes and/or to obtain particles that have a smooth outer surface and that are either toroidal or spherical.

In one embodiment, the controlled flocculation is achieved by contacting the nano titania sol with a dispersant.

The dispersant may suitably comprise one or more dispersant material selected from: water soluble carboxylic acids, water soluble salts of carboxylic acids, water soluble polycarboxylic acids, water soluble salts of polycarboxylic acids, phosphates and silicates.

In one embodiment, the water soluble carboxylic acid is an α-hydroxy carboxylic acid. The α-hydroxy carboxylic acid may comprise one, two or three carboxylic acid groups. Examples of the α-hydroxy carboxylic acid that can be used are lactic acid, glycolic acid, malic acid, tartaric acid, mandelic acid and citric acid.

In another embodiment, the water soluble carboxylic acid is a β-hydroxy carboxylic acid.

The water soluble polycarboxylic acid may be a dicarboxylic acid or a tricarboxylic acid.

In general, citric acid may be a preferred choice due to its low cost and ready availability.

The dispersant will be added to the sol at a level so as to achieve the desired adjustment of the iso-electric point and hence to cause either more or less flocculation. Greater flocculation will lead to a larger size for the flocculated particles.

In one embodiment, the dispersant is added to the sol in an amount of from 0.1 to 15 wt %, such as from 0.2 to 12 wt % or from 0.5 to 10 wt %.

In general, the slurry will be at a pH close to the natural iso-electric point and therefore the use of a low amount of dispersant ensures that there is closeness between the iso-electric point and the pH. This leads to larger pore sizes and higher specific surface areas for the titania particles. For example, the amount of dispersant may be from 0.1 to 5 wt %, such as from 0.3 to 4 wt % or from 0.5 to 3 wt %, e.g. from 1 to 2.5 wt %.

In contrast, the use of a higher amount of dispersant ensures that there is a greater gap between the iso-electric point and the pH. This leads to smaller pore sizes and lower specific surface areas for the titania particles. For example, the amount of dispersant may be from 6 to 15 wt %, such as from 7 to 13 wt % or from 8 to 12 wt %, e.g. about 9 to 10 wt %.

Controlled Drying During Preparation of Dried Titania Particles from a Titania Sol In the process of the present invention, once a suitable flocculated sol has been provided, the sol is then subjected to a drying process.

The temperature used during the drying step can be controlled so as to control the morphology of the resultant dried titania particles. Preferably, the temperature is controlled so as to control the particle shape of the resultant dried titania particles.

A higher drying temperature results in toroidal (doughnut shaped) particles and a lower drying temperature results in more spherically shaped particles.

In one embodiment, the drying temperature is from 50 to 350° C., such as from 75 to 325° C., or from 100 to 300° C.

The use of a lower drying temperature results in more spherically shaped particles. For example, the drying temperature may be from 50 to 150° C., such as from 75 to 140° C., or from 100 to 125° C.

The use of a higher drying temperature results in more toroidal shaped particles. For example, the drying temperature may be from 160 to 350° C., such as from 200 to 300° C., or from 220 to 280° C.

The drying process may suitably be spray drying or thermal drying. Preferably the drying process is spray drying.

The sol as dried may in one embodiment have a solids content of from 1% to 35% wt/wt, e.g. from 2 to 25% wt/wt or from 5 to 20% wt/wt or from 10 to 18% wt/wt.

Of course, if when using the process of the invention it is decided to not control the particle shape by use of the drying temperature, any known drying process may be used. This includes freeze drying, thermal drying and spray drying.

Optional Steps

It may be that the titania particles are washed, but this is not essential. If the particles are washed, it may be that the washing is carried out to reduce the level of salts and thus the conductivity. In one embodiment washing is carried out to give a conductivity of less than 2 ms/cm.

As the salt level (and therefore conductivity) is reduced, shielding of charges decreases enabling repulsive forces to be expressed and consequently free reconfiguration of particles and tighter packing is allowed. This means that a higher surface area can be achieved. In addition, the gelling behaviour of the sol appears to reduce when the conductivity is lowered, and higher concentrations of particles in the sol may be possible.

In another embodiment, however, the particles are not washed.

Optional Components

Depending on the intended end use of the titania, other components can also be present during the manufacture of the titania. These may, for example, be incorporated into the sol before the sol is dried.

In one embodiment, one or more active catalytic components, such as tungsten or vanadium, are included during the manufacture of the titania particles. These make the product suitable for catalytic reduction units, such as SCR (selective catalytic reduction) units for automobile and static applications.

In another embodiment, one or more thermal stabiliser components, such as silica, ceria or lanthana, are included during the manufacture of the titania particles. These assist with ensuring large specific surface areas can be maintained when the product is used in applications where elevated temperatures occur.

In another embodiment, one or more templating agents, such as polystyrene latex nano spheres (PSL), may be used. PSL or any other templating agent can be mixed with the sol prior to dying. The resultant particle can then be further heat treated to remove the templating agent to form highly porous particles. Templating agents are known to those skilled in the art and the use of templating agents is discussed in, for example, Nandiyanto et el, Chemical Engineering Journal 152 (2009) 293-296.

By the use of one or more templating agent, the products obtained by the invention can be provided with a higher level of internal pores.

Uses

The present invention may be used to manufacture titania particles suitable for use in numerous applications, as described further below. Dependent on the intended use, the skilled person will be able to identify desired morphology characteristics of the titania, e.g. in terms of pore size and/or particle shape, and can then control the manufacturing method as described above to obtain said desired characteristics.

One preferred use of the particles is in the manufacture of catalyst products, e.g. the particles may be used as a catalyst support, but other suitable end uses are also contemplated, as discussed below.

Emissions Catalysts

The titania particles may be produced in a manner that gives rise to large pore sizes, and hence high surface areas, when end uses are envisaged that involve providing the titania as a catalytic support, such as in relation to emissions catalysts.

The titania particles may be used as a carrier for catalysts used to reduce or eliminate noxious gases prior to release to the atmosphere. Examples of uses include applications in mobile road systems (such as cars, motorcycles and trucks); mobile non-road applications (such as rail and marine) and static applications (such as power stations and waste incinerators).

Catalysts that can be provided on the titania particles include ruthenium, rhodium, palladium, iridium, platinum, osmium, iron, cobalt, nickel, copper, silver, vanadium, tungsten, chromium and molybdenum. In these fields platinum, palladium and vanadium tend to be preferred. These catalysts can convert nitrogen oxides, carbon monoxide and sulphur oxides into less noxious substances. Tungsten is also used, especially in selective catalytic reduction.

Selective catalytic reduction (SCR) of nitrogen-based gases is possible in the presence of ammonia. These nitrogen-based gases include nitric oxide (NO), nitrogen dioxide ($NO_2$) and nitrous oxide ($N_2O$); these have detrimental affects environmentally such as contributing to ground level ozone, generation of acid rain and global warming. They also cause and/or aggravate medical issues, such as respiratory problems.

Removal of these gases can be achieved by passing emissions gases together with ammonia over a catalyst, such as platinum or vanadium.

In order to achieve high efficiencies, a large surface area is required permit a maximum contact of the gas to the unit area of catalyst. Titania, alumina and zeolites are common catalytic carriers that can provide this large surface area.

There are two main manufacturing processes: i) extruded ceramic honeycomb made from titania, alumina or zeolites, with the active catalysts mixed into the carrier prior to extruding and ii) a ceramic or metal honeycomb, which is then dipped into a slurry containing titania and the active catalysts, which is then dried; this is known as a washcoat.

In one embodiment, the catalytic porous titania is present on a support. Examples of support materials include glass, ceramic, metal, plastic, cement, concrete, asphalt, textile and paper. The support may be porous or non-porous. Examples of porous supports include a mat of fibers, a zeolite, or a porous film. The term "on a support" refers to the catalytic porous titania being provided on at least a portion of a surface of the support. If the support is porous, the term "on a support" further includes the possibility that catalytic porous titania is present within some or all of the pores of the support.

In one embodiment, the titania particles can be used as a carrier or washcoat for selective catalytic reduction units. In such an embodiment, it will be desired to prepare titania particles that have large pore sizes, because then the porous titania will impart a large surface area.

In one such embodiment, the titania particles may be prepared so as to have a toroidal shape because this shape may lend itself to improved permeability when used in applications such as selective catalytic reduction (SCR) units for automobile and static applications.

In another embodiment, when preparing the particles, the titania sol may be mixed with active catalysts prior to spray drying. In such an embodiment, it will be desired to prepare titania particles that have large pore sizes, because then the porous titania will impart a large surface area. This will result in a large surface area porous material that has catalytic activity. Such active catalysts include ruthenium, rhodium, palladium, iridium, platinum, osmium, iron, cobalt, nickel, copper, silver, tungsten, vanadium, chromium and molybdenum.

In yet another embodiment, titania particles are prepared that have large pore sizes, because then the porous titania will impart a large surface area, and the titania sol is mixed with compounds prior to spray drying that help maintain its large surface area when exposed to elevated temperatures. In this regard, it is known that titania used for ceramic extrusions or as washcoats can be prone to a reduction in surface area as a result of the elevated temperatures at which the catalysts are operated. By using certain compounds, this effect can be mitigated. These compounds include tungsten (vi) oxide from a precursor such as ammonium metatungstate or ammonium paratungstate, lanthanum oxide from a precursor such as lanthanum nitrate hexahydrate, cerium oxide from a precursor such as cerium nitrate hexahydrate and silica from a precursor such as silicic acid. One or more such compounds may be used. Such compounds may be added to the sol prior to spray drying. These may be incorporated immediately prior to spray drying, or may be added during parts of the sulphate process. For example, ammonium metatungstate may be incorporated into the precipitation step of the sulphate process.

Another embodiment is the use of porous titania in the manufacture of diesel particle filter (DPF)/SCR combination units. In an effort to reduce unit size, while maintaining efficacy, manufacturers are attempting to combine these two units within emission control systems. However, by using conventional titania as the filter, increased back pressure will ensue due to the poor porosity of the structure. The use of porous titania will permit a gas flow through the filter with reduced back pressure but maintain a good gas to solid contact ratio.

In one embodiment of the invention the titania particles may be prepared so as to have a toroidal shape because this shape offers improved permeability for gas flow (DPF) as well as improved specific surface area for the selective catalytic reduction (SCR).

In addition, the titania may be coated with silica or the like to provide improved thermal stability.

Chemical Catalysis

The titania particles may be produced in a manner that gives rise to large pore sizes, and hence high surface areas. This may be beneficial when end uses are envisaged that involve providing the titania as a catalytic support, such as in relation to chemical catalysts.

Examples include the desulphurisation of gases in the petroleum industry by the Claus process, whereby the porous titania beads act as a catalyst to promote the hydrolysis of carbonyl sulphide and carbon disulphide to hydrogen sulphide and carbon dioxide. Titania is known to give an improved conversion rate compared to alumina based catalysts. In one embodiment, the porous titania will impart improved gas to solid contact and so enhance chemical catalysis processes such as the Claus process.

In another embodiment, the porous titania may be mixed with a binder and extruded to create high surface area titania pellets for use as a chemical catalyst or chemical catalyst support.

In yet another embodiment, the porous titania beads or extrudate may undergo an impregnation process, whereby catalytic promoters such as molybdenum, nickel, cobalt etc. or a mixture thereof, may be impregnated into the pores of the porous titania.

In another embodiment, the addition of a thermal stabiliser (such as ammonium metatungstate or ammonium paratungstate, lanthanum oxide from a precursor such as lanthanum nitrate hexahydrate, cerium oxide from a precursor such as cerium nitrate hexahydrate and silica from a precursor such as silicic acid) may be used to improve catalyst performance by maintaining a high BET surface area at elevated temperatures.

Photocatalytic Embodiments—Self Cleaning, Antibacterial, Air Purification

The titania particles may be produced in a manner that gives rise to large pore sizes, and hence high surface areas. This may be beneficial when catalytic end uses are envisaged, such as in relation to photocatalysis.

It is well known that $TiO_2$ is an efficient and benign photocatalyst. Photons with an energy greater than or equal to the band gap of $TiO_2$ (3.2 eV for the anatase phase) that strike a $TiO_2$ crystal, energise an electron which in turn jump from the valance band into an unoccupied conduction band. This results in electron pairs in the conduction band and positive electron holes in the valence band. These in turn can then react with $O_2$ to form the hydroxyl radical of $O_2^-$ and with $H_2O$ to form the hydroxyl radical OH respectively. These radicals are extremely reactive and will degrade organic matter.

In one embodiment, a porous titania with a large surface area can be provided, as this will result in more electron pairs and holes at the surface and will therefore be more photocatalytic. It may be used for self cleaning purposes when incorporated into materials such as exterior coatings, concrete, tiles, extruded ceramic fascias, plastics, textiles etc.

In another embodiment, a titania material that is porous but that is not nano sized (e.g. with a particle size of 1 micron or more) can be provided, which will result in lower degree of light scattering/lower refractive index, permitting the porous titania to be used for self cleaning in coloured systems while having a lower tinting strength compared to pigmentary titania.

In another embodiment, dopants can be added during the production of the titania particles. This leads to further improvements in catalytic efficacy in the porous titania. Additionally, certain dopants can alter the band gap and so can alter the responsiveness of the catalyst at different wavelengths of light. Examples of dopants include i) noble metals: gold, nickel, nitrogen, palladium, platinum, rhodium, silver, tin and vanadium, ii) cationic metals: aluminium, cerium, chromium, cobalt, copper, erbium, europium, gadolimium, iron, lanthanum, manganese, molybdenum, neodymium, nickel, osmium, praseodymium, rhenium, ruthenium, samarium, vanadium and zinc and iii) anionic non-metals: carbon, fluorine, nitrogen, phosphorus and sulphur.

In one embodiment, the catalytic porous titania may be mixed with a reactant fluid and irradiated with visible light to provide for a chemical reaction of one or more components of the reactant fluid. The catalytic porous titania may then be recovered from the fluid and recycled for use in another portion of the reactant fluid. The catalytic porous titania may be used in place of general metal catalysts such as cobalt, nickel, copper, gold, iridium, lanthanum, nickel, osmium, platinum, palladium, rhodium, ruthenium, silver, strontium, yttrium, zirconium and tin.

In another embodiment, the catalytic porous titania is present on a support, and the reactant fluid may flow in contact with the support and the composition, and when irradiated with light, provides for a chemical reaction of one or more components of the reactant fluid. In this configuration, the catalytic porous titania may be exposed to a constant stream of fluid and does not require separation of the catalytic porous titania from the fluid after the reaction is performed. For example, a catalytic porous titania may be applied to a support, for example an automobile exhaust system, where the exhaust system has been fitted with a visible or UV light source, such as a fiber optic light source or an LED light source. Irradiation of the catalytic porous titania during operation of the automobile engine may provide for degradation of organics and other pollutants generated in the engine into environmentally acceptable substances.

In another embodiment, the catalytic porous titania may be present on a surface that is contacted with various environmental contaminants or pollutants, such as dirt, grease and other organic and inorganic contaminants and pollutants. The catalytic porous titania, optionally in the form of a formulation comprising the catalytic porous titania, is applied to the surface and the surface is irradiated with UV/visible light while the contaminants or pollutants contact the surface. Upon exposure to UV/visible light, the surface becomes "self-cleaning" because it degrades or inactivates the contaminants or pollutants. For example, self-cleaning glass may have a transparent or translucent coating of the catalytic porous titania applied on one or both sides of the glass. Contaminants that contact the glass may then be degraded when the glass is exposed to UV/visible light.

In another embodiment, the catalytic porous titania may be present on a surface that is exposed to microbes (such as bacteria and fungi) and/or viruses. Upon exposure to UV/visible light, such a surface may be a "disinfecting surface" because it destroys or inactivates microbes and/or viruses that are present on the surface. For example, surfaces in residential, commercial or hospital environments may have a coating of the catalytic porous titania applied on the surface. Microbes and/or viruses that contact the surface may then be destroyed or inactivated when the surface is exposed to UV/visible light. Examples of surfaces that may be made into disinfecting surfaces include countertops, flooring, walls, handles, switches, knobs, keypads, telephones, bed frames and surfaces of medical instruments.

The catalytic porous titania may also be applied to a surface to provide temporary disinfection of the surface. For example, the catalytic porous titania may be introduced into a cleaning composition. The cleaning composition may be in the form of a liquid, foam or a lotion. Application of the cleaning composition to a surface, followed by exposure of the surface to UV/visible light, may cause the destruction or inactivation of microbes or viruses that are present on the surface. Such cleaning compositions may be formulated for use on skin to provide a disinfecting personal care product.

In yet another embodiment, the catalytic porous titania may be used in composite materials, including polymer composites, fabrics and nonwoven materials. For example, the catalytic porous titania may be incorporated with fibers into textile fabrics. These fabrics may provide for degradation of contaminants in contact with the fabric when exposed to UV/visible light, resulting in self-cleaning and/or self-disinfecting fabrics.

The catalytic porous titania may also be used for air and/or water purification. For example, the catalytic porous titania may be mixed with contaminated air or water and irradiated with UV/visible light. Contaminants in the air or water may be degraded into substances that are volatile or that are more easily separated from the air or water. For example, contaminants containing organic substances and halogenated substances may be degraded into carbon dioxide and halide ions, which may then be separated from the air or water. In the case of air purification, the degradation of contaminants such as NO and $NO_2$ either individually or collectively and VOCs may also result in cleaner air and control of odours in the air.

Drug Release

In one embodiment, titania particles may be prepared in accordance with the invention so as to be hollow, or porous with large size pores, or spherical with highly rough surfaces. These titania particles may be used as a carrier in a drug delivery system, whereby the active ingredient is impregnated into the hollow particle or into the pores of the highly porous particle.

The low density, porous particles are ideal for pulmonary drug delivery due to their aerodynamic shape which gives rise to good pulmonary dispersibility.

In another embodiment, titania particles may be prepared in accordance with the invention so as to be hollow, or porous with large size pores, or spherical with highly rough surfaces, and these particles are impregnated with an active ingredient and then coated in a degradable coating, whereby the coating is degraded following delivery, e.g. to the GI tract. Types of delivery include immediate, thermo-sensitive release and controlled release.

Another embodiment involves the preparation of titania particles with large pore sizes in a method whereby there is also impregnation of magnetite, or another detectable substance, into the porous titania. Alternatively, the titania particles with large pore sizes are prepared, followed by the encapsulation of magnetite (or another detectable substance) by spray drying the titania sol with the magnetite or other detectable substance. The particles prepared in this manner are suitable for use as intravascular probes for diagnostic purposes such as imaging.

Another embodiment involves the preparation of titania particles with large pore sizes and/or hollow titania particles and/or highly rough spherical titania particles, in a method whereby there is also impregnation of active substance(s) into the hollow/porous/rough surfaced titania. These particles may be used as a drug delivery system used for both active and passive targeting.

Biodegradable Packaging

In one embodiment, titania particles may be prepared in accordance with the invention so as to be hollow, or porous with large size pores, or spherical with highly rough surfaces. These titania particles may be used as a means to biodegrade packaging following a predetermined time period.

This involves encapsulating the particle with a compound that will photo-catalytically degrade over a predetermined time period. Said particle will then over time start to photo-catalytically degrade the packaging into which it is incorporated.

Nb Dope for Conductive Coatings

In one embodiment, titania particles may be prepared in accordance with the invention so as to be hollow, or porous with large size pores. These titania particles may be doped with niobium. Accordingly, the semiconductor nature of the titania can be modified, so that the particles instead become a conductor. The particles may then be used in conductive coatings.

In this respect, it is possible to create conductive coatings based on such doped particles for use in display screens or organic light emitting diodes. Porous or hollow titania particles that have a relatively large particle size (above nano size, e.g. 1 micron in diameter or more) exhibit a lower degree of light scattering compared to titania manufactured for its pigmentary properties. As a result, it is possible to create a transparent coating which can be utilised for display purposes.

In one embodiment, porous or hollow titania particles are produced by the process of the invention and that have been doped with niobium during the production process. These exhibit transparency and conductivity and can be used in applications such as display screen equipment or organic light emitting diodes.

Dye Sensitised Solar Cells (DSSCs)

In one embodiment, titania particles may be prepared in accordance with the invention so as to be porous with large size pores and so as to have a high surface area.

The semiconductor properties of the titania, in combination with this large surface area and highly porous structure, means these particles may be used as semiconductor films in DSSCs (Dye Sensitised Solar Cells).

For example, an electric current is produced when dye molecules are excited by exposure to light. The excited dye molecules transfer electrons into the conduction band of the titania material, which conducts the electrons to a current collector connected to an electrical circuit with a load. The highly porous structure of the titania gives a high surface area and therefore a high level of absorption of dye molecules onto the porous titania structure thus resulting in increased cell efficiency.

In a further embodiment, the porous titania material may be used as a semiconductor film in a flexible DSSC. Low temperature curing is possible due to the improved primary particle contacts in the aggregated particles, thus resulting in effective electrical conductivity across the particles. For example, a DSSC can be created on a flexible plastic substrate that requires low curing temperatures.

In yet another embodiment, a sensitizing dye for use in DSSCs can be added into the pore structure of the titania during manufacture of the titania or after the dried titania has been obtained. The material would therefore be supplied pre-loaded with dye, thus eliminating the lengthy process of dying the electrode when fabricating DSSCs. This would reduce both the time and complexity of DSSC production, and potentially increase the dye absorption onto the catalytic material, therefore increasing the potential efficiency of the cell.

In one embodiment, titania particles may be prepared in accordance with the invention so as to be porous with a controlled size of pores.

In DSSC applications it can be useful for the titania particles can have their pore structures specifically "tuned" for the end use. In the DSSC applications, the $TiO_2$ has dye adsorbed onto its surface and the more dye that is accessible by the electrolyte, and the more that is in contact with the $TiO_2$, the better the electron transfer. Therefore by tuning the pore system (e.g. in terms of the number of pores, size of pores), the potential efficiency of the solar cell can be improved.

UV Protection

In one embodiment, titania particles may be prepared in accordance with the invention so as to be porous with large size pores and so as to have a high surface area. Preferably the particles are larger than nano size, e.g. 1 micron in diameter or more.

Due to these particles having a relatively large particle size, along with the highly structured porous nature, similar to that of an aerogel, the particles will have a low refractive index. Therefore the particles can be used to provide a material, e.g. a coating, with UV protection properties. The material may be transparent.

In one such embodiment the porous titania can be given a coating of silica; this would lock in the photo-activity of the $TiO_2$, and hence make an excellent product for UV protection.

These particles could be used in personal care products and cosmetic formulations, such as sunscreens, moisturizers, color foundations, lipstick, lip balm, foot care products and ointments. These particles could also be used in coatings and masonry formulations, such as in automotive coatings, wood coatings, building coatings, glass coatings, flooring, swimming pool surfaces, and cement or concrete coatings.

In one embodiment the porous titania particles could be silica coated to provide an effective UV protector for use in plastics. For example, the silica coated particles could be incorporated into a polymer, such as plastic containers, window frames, building sidings or the like, and could provide protection to the polymer from UV light. This would lead to greater durability and life span of the plastics exposed to UV light.

In another embodiment the particles may be encapsulated in silica, for example a stable nano silica sol may be mixed with the $TiO_2$ sol prior to drying. The mix would then be spray dried in conditions to favor encapsulation; this would result in a titania bead encapsulated in silica, due to the smaller silica nano particles migrating to the outer edge of the droplet in the spray drying process. This would provide a particle fully encapsulated in silica and therefore provide a particle with effective UV protection properties that could be used in any situation where a UV protective coating is required.

In further embodiments the porous titania material can be doped with metals, such as Fe, Cr, Mn, Ce, Ni, Cu, Sn, Al, Pb, Ag, Zr, Zn, Co, Mo and W, or non-metals such as B, C, N, P, As, S, Se, Te, F, Cl, Br and I. Doping with these elements can cause a increase in the catalytic properties and/or a decrease in the catalytic properties; therefore it is possible to increase the UV protection properties. For example, a co-precipitation can be used to dope transition metals into the titanium dioxide lattice, whereby a dopant is added to the titania sulphate liquor; this is then precipitated out resulting in doped titania. This would then improve the UV protection due to a change in band gap to reduce the photo-catalysis.

In a further embodiment the porous titania may be subject to calcination; this converts the crystal structure from the anatase structure to the rutile structure. This therefore makes the particles less photoactive, as the rutile structure of titanium dioxide is less photoactive than that of the anatase form. Of course, rutile titania particles may also be prepared in the sol in the first place. Use of rutile titania may be helpful in UV protection applications such as those noted above.

CICPs (Complex Inorganic Coloured Pigments)

In one embodiment, titania particles may be prepared in accordance with the invention so as to be porous with large size pores and so as to have a high surface area.

This porous titania material can be used as a base for CICP materials, due to its highly porous nature and high surface area.

For example, the titanium dioxide base can be combined with one or more metal ions, such as antimony, chromium, nickel, manganese, iron, niobium, tin, tungsten, vanadium, zinc or cobalt. The mix can then be calcined to give highly coloured, high chroma pigments.

Water Splitting

In one embodiment, titania particles may be prepared in accordance with the invention so as to be porous with large size pores In one such embodiment, the porous titania material may be used as a catalytic material for the production of hydrogen and oxygen via water splitting.

For example, water containing the catalytic composition may be decomposed into hydrogen and oxygen by photo-catalysis when the water is irradiated with UV/visible light. Alternatively this decomposition may be carried out in a photo-chemical cell having a photo-anode containing a quaternary oxide. The use of a photo-electrochemical cell has the benefit that it can provide for separate collection of hydrogen and oxygen from the cell.

Lithium-Ion Battery

In one embodiment, titania particles may be prepared in accordance with the invention so as to be porous with large size pores In one such embodiment, the porous titania material may be used as an electrode in a lithium-ion battery, due to the highly porous nature and the good inter-particle contacts in the aggregated particle. This provides efficient transport of lithium ions and favoured ion-exchange ratio, which results in a high value of charge/discharge capacity and good kinetic characteristics. There are also fewer safety concerns than with use of conventional carbon negative electrode batteries.

Sensors

In one embodiment, titania particles may be prepared in accordance with the invention so as to be porous with large size pores and so as to have a high surface area.

In such an embodiment, the semiconductor and catalytic properties of the titania can be used for sensing gases. Therefore the titania particles may be used as a sensor material.

The sensing process is mainly a surface process between the $TiO_2$ surface and the gas molecules; therefore the porous particles prove excellent candidates, due to the highly porous structure and large surface area.

Titanium dioxide can be used as a gas sensor because the electrical conductivity of titanium dioxide can change depending on the chemical composition of the environment. The electrical resistance of the titania particles (or a material containing the titania particles) may be measured in an environment and compared with the electrical resistance in a control environment. The difference between the measured resistance and the control resistance may be correlated with the amount and/or identity of a gas in the environment.

Examples of gases that may be identified and/or measured include hydrogen, carbon monoxide, hydrogen sulfide, and water, acetone, ethanol and methanol. Certain titanium dioxide based gas sensors can be used at low temperatures, whilst other are suited to elevated temperatures.

In a further embodiment the porous titania can be doped with metals such as Al, Pd, Pt, Nb, Cr, Pt, Ta, K and La; this will improve the selectivity and sensitivity of the porous titania particles for use as a gas analyser.

Fuel Cells

In one embodiment, titania particles may be prepared in accordance with the invention so as to be porous with large size pores and so as to have a high surface area.

In one such embodiment, due to the high surface area and its semiconductor properties, the porous titania particles can be used as a catalyst support in a fuel cell, especially in proton exchange membrane fuel cells (PEMFC).

A PEMFC works by using a fuel (usually hydrogen, but in some cases organic compounds such as methanol). The fuel cell consists of an anode, cathode and an electrolyte. The anode consists of a catalyst (usually platinum); this oxidizes the fuel. The positively charged particles travel through a polymer electrolyte membrane whereas the negatively charged electrons must run through an external circuit to the cathode, thus resulting in the generation of electricity. The cathode also consists of a catalyst (usually platinum) to reduce the positively charged particles to $H_2O$.

The platinum catalysts are usually supported on a porous carbon support; however porous titania particles made by the process of the invention would prove a effective support medium, due to their large surface area and excellent electron transfer properties. They will also have improved stability as compared to carbon supports.

Water Purification

In one embodiment, titania particles may be prepared in accordance with the invention so as to be porous with large size pores and so as to have a high surface area. Preferably the particles are larger than nano size, e.g. 1 micron in diameter or more.

In one such embodiment, the highly porous product with a large surface area and large particle size, in combination with its catalytic composition, means the porous titania particles can be used in the field of water purification. Therefore the titania particles may be used as a water purification material.

For example, the titania particles may be mixed with contaminated water and irradiated with UV/visible light. Contaminants in the water may be degraded into substances that are volatile or that are more easily separated from the water. For example, contaminants containing organic substances and halogenated substances may be degraded into carbon dioxide and halide ions, which may then be separated from the water.

Currently problems arise with using nano titanium dioxide particles; the problem lies with separating the nano particles from the water. However the porous titania particles made according to the process of the invention can have a larger than nano particle size, thus filtering the $TiO_2$ particles from the water will be easier and more effective.

The particles still exhibit the beneficial properties of the nano titania, however, such as large surface area and high photocatalytic activity. Therefore the particles are as effective, if not more effective, than nano titanium dioxide particles.

In one such embodiment the porous titania particles can be doped with metals, such as Fe, Cr, Mn, Ce, Ni, Cu, Sn, Al, Pb, Ag, Zr, Zn, Co, Mo and W, or non-metals such as B, C, N, P, As, S, Se, Te, F, Cl, Br and I. This doping causes a change in the band gap and thus an increase in the photocatalytic properties, therefore increasing the effectiveness of its use in water purification systems.

The invention will now be further described, in a non-limiting fashion, with reference to the following examples and drawings.

BRIEF DESCRIPTION OF THE DRAWINGS

FIGS. 2b-2f are images obtained using transmission electron microscopy (TEM) of the micelles produced by sulphate precipitation at nucleation levels of 6%, 2%, 1%, 0.5% and 0.1%, respectively, in Example 3.

FIGS. 5a-5d are images obtained by scanning electron microscopy (SEM) of the particles of the dried products obtained in Example 7 for a sol having 1% solids at dryer inlet temperatures of 110° C., 150° C., 200° C., 250° C., respectively.

FIGS. 7a-7d are images obtained by scanning electron microscopy (SEM) of the particles of the dried products obtained in Example 7 for a sol having 17% solids at dryer inlet temperatures of 110° C., 150° C., 200° C., 250° C., respectively.

EXAMPLES

Example 1

A concentrated anatase titania sol was obtained by a 6% nucleated precipitation that was carried out in accordance with the method of WO2011/033286. Samples of the sol were thermally dried at (a) 105° C. and (b) 200° C.

The specific surface areas of each of the dried samples were tested using the BET method.

| Sample | Thermally Dried Sample | |
|---|---|---|
| | 105° C. | 200° C. |
| BET specific surface area ($m^2/g$) | 280.9 | 311.2 |

When repeated with a higher drying temperature being applied, the particles were more toroidal in shape and had a higher specific surface area.

Example 2

A concentrated titania sol was prepared using clean Scarlino rutile nuclei (washed free of salts, 0.5 ms/cm). The sol was produced as in method outlined in WO2011/033286. In this regard, the washed Scarlino nuclei were peptised to pH 1.5, 10% citric acid was added, MIPA was added to take the pH to 8, and then the particles were washed to <2 ms/cm.

The concentrated sol was then spray dried at 17% at 110° C. using a Lab Plant Super 7 laboratory spray drier.

The specific surface area of the sample was tested using the BET method. The pore size and pore volume were measured by both mercury porosimetry and nitrogen isotherms.

| | |
|---|---|
| BET SSA (m²/g) | 87.52 |
| Mercury Large Pore Size (μm) | 1.7018 |
| Mercury Small Pore Size (nm) | 23.1 |
| Nitrogen Large Pore Size (nm) | 40.65 |
| Nitrogen Small Pore Size (nm) | 1.4 |
| Pore Volume mercury (cm³/g) | 0.36 |
| Pore Volume nitrogen (cm³/g) | 0.31 |

Figure 1:
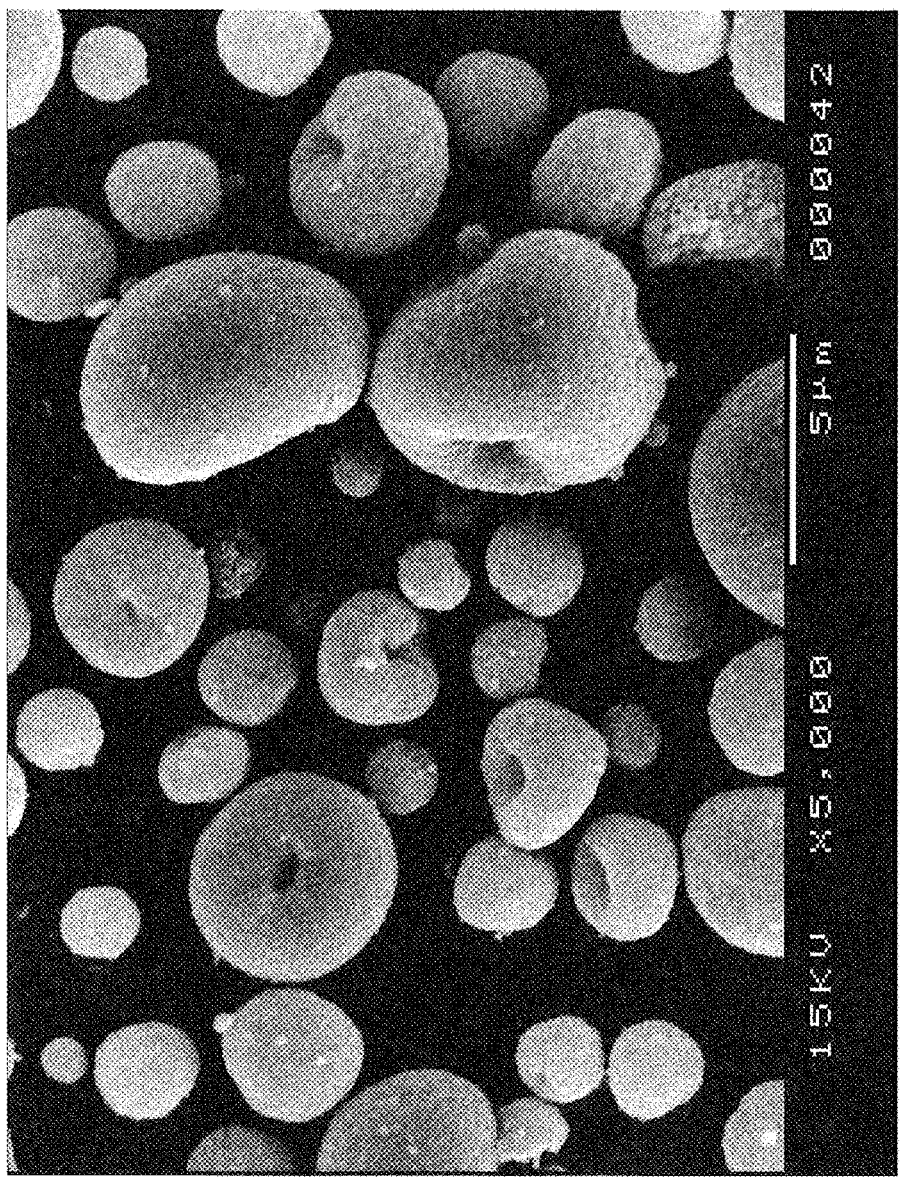
FIG. 1 is an image obtained by scanning electron microscopy (SEM) of the particles of the product obtained in Example 2.

Scanning electron microscopy (SEM) was carried out to image the particles of the product obtained. The obtained image is shown in FIG. 1.

When the experiment is repeated with a higher drying temperature being applied, the particles become more toroidal in shape and have a higher specific surface area.

Thus the invention applies for rutile material as well as anatase.

Example 3

Several different concentrated titania sol products were obtained by precipitation that was carried out in accordance with the method of WO2011/033286. These were obtained using different levels of nucleation at precipitation. One had a 1% nucleated precipitation, one had a 2% nucleated precipitation and one had a 6% nucleated precipitation.

Samples from each product were spray dried using a LabPlant SD-05 laboratory spray drier.

The specific surface areas of each of the dried samples were tested using the BET method.

The pore size was measured using mercury porosimetry, using a Micromeritics AutoPore IV porosimeter.

| | % Nucleation at precipitation | | |
|---|---|---|---|
| | 1 | 2 | 6 |
| BET SSA (m²/g) | 219.8 | 269.1 | 314.5 |
| Pore Size (nm) | 9.5 | 6.7 | 4.3 |

It can be seen that by using a lower level of nucleation, the pore size (diameter) was higher.

This confirms what the present inventors have determined, namely that by controlling the extent of nucleation, and therefore by controlling the micelle size, the pore size in the resultant titania particles can be controlled, with lower nucleation levels giving rise to larger pore sizes in the resultant titania particles.

Accordingly, a desired set of properties in the end product can be obtained by suitable control of the parameters in the process of manufacture of the titania.

Figure 2A:
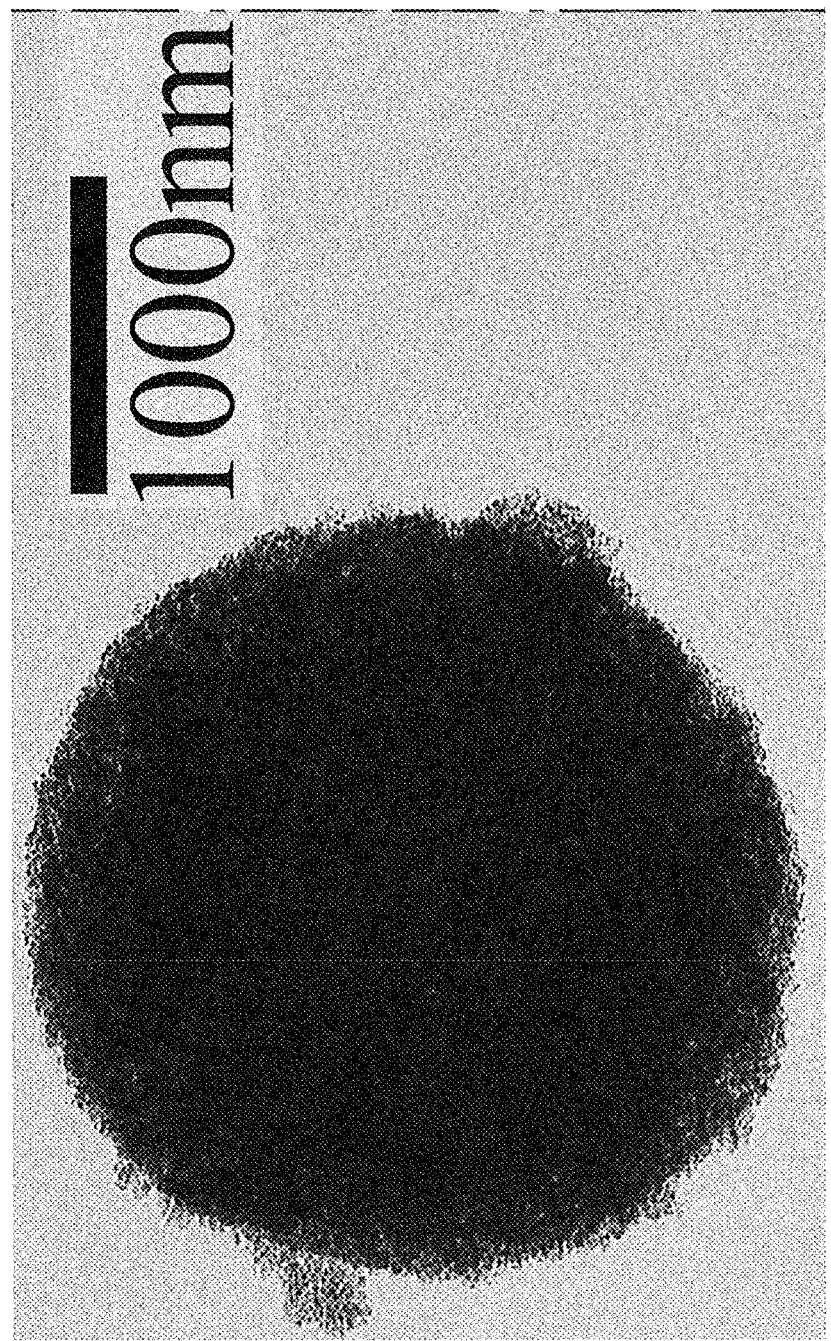
FIG. 2a is an image obtained using transmission electron microscopy (TEM) of the particles of the product obtained using 6% nucleation at precipitation in Example 3.

Transmission electron microscopy (TEM) was also carried out to image the particles of the product obtained using 6% nucleation at precipitation. The obtained image is shown in FIG. 2a.

Transmission electron microscopy (TEM) was then carried out to image the micelles produced by sulphate precipitation at nucleation levels of 6%, 2%, 1%, 0.5% and 0.1%. The obtained images are shown in FIGS. 2b-2f respectively.

It can be seen that micelle sizes as large as 150 nm or more can be obtained with a nucleation level of 0.1% or lower. By increasing the nucleation level the size of the micelles decreases. Therefore control of the micelle size can be exerted. As a consequence, the pore size in the resultant titania particles can be controlled.

As discussed above, the present inventors have determined that by controlling the micelle size the pore size in the resultant titania particles can be controlled, with larger micelles giving rise to larger pore sizes in the resultant titania particles.

Accordingly, a desired set of properties in the end product can be obtained by suitable control of the parameters in the process of manufacture of the titania.

Example 4

A range of concentrated slurries were obtained by Mecklenberg precipitation, in accordance with the method of WO2011/033286. A 6% nucleation level was used at precipitation. The titania slurries were peptised with a peptising agent to achieve various pH levels (1.5, 2, 3.25, 4.5 and 5.5). Hydrochloric acid was used as the peptising agent.

The flocculation size of the slurries was determined using X-ray sedimentation method on a Brookhaven machine (BI-XDC X-ray Disc Centrifuge).

| | pH from peptisation | | | | |
|---|---|---|---|---|---|
| | 5.5 | 4.5 | 3.25 | 2 | 1.5 |
| Size of Flocculated product in slurry (nm) | 1319 | 962 | 957 | 33 | 14 |

It can be seen that at a pH close to the iso-electric point (pH 5-6) there is more flocculation and the slurry is less dispersed.

This leads towards larger pore sizes. It also leads towards particles that have a rough outer surface and that appear "fluffy". This was illustrated by the use of scanning electron microscopy.

Figure 3B:
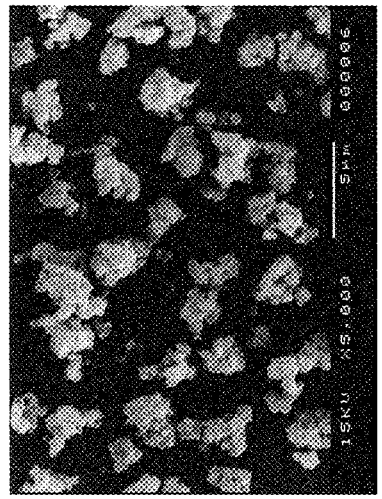
FIGS. 3a-3e are images obtained by scanning electron microscopy (SEM) of the particles of the products obtained in Example 4 at pH values of 5.5, 4.5, 3.25, 2, and 1.5, respectively.
Figure 3A:
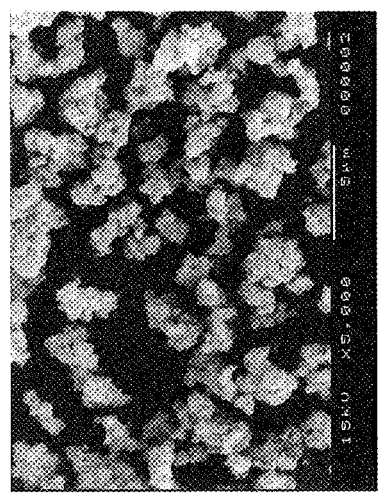
Figure 3E:
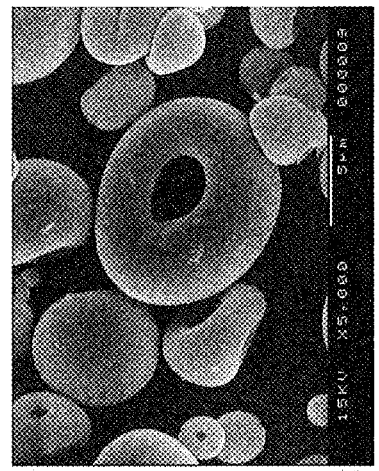
Figure 3D:
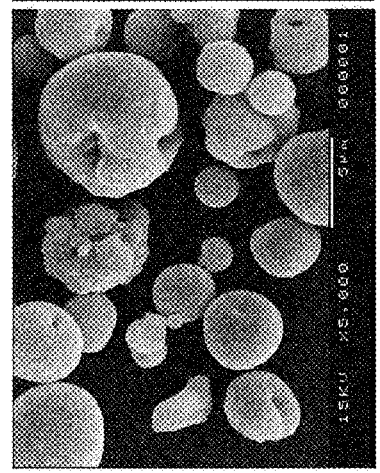
Figure 3C:
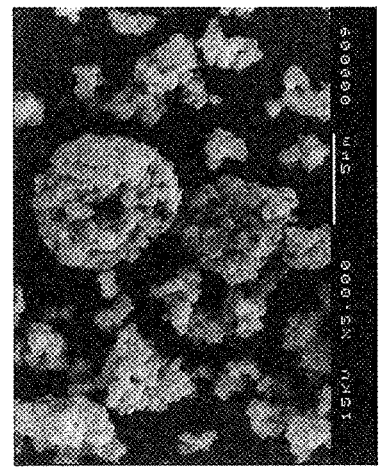

In this regard, scanning electron microscopy (SEM) was carried out to image the particles of the product obtained. The obtained images are shown in FIGS. 3a-e. FIG. 3a is pH 5.5, FIG. 3b is pH 4.5, FIG. 3c is pH 3.25, FIG. 3d is pH 2, and FIG. 3e is pH 1.5.

It can be seen that at a pH closer to the iso-electric point (pH 5-6), larger pore sizes are obtained and the particles have a rough outer surface and appear "fluffy". As the pH moves further away from the iso-electric point, smaller pore sizes are obtained and the particles have a smoother outer surface and are either toroidal or spherical.

Example 5

A range of concentrated sols were prepared by Mecklenberg precipitation, in accordance with the method of WO2011/033286. A 1.8% nucleation level was used at precipitation, peptisation was effected to pH 1.5, and citric acid (dispersant) was added.

The sols were prepared with various levels of citric acid (1%, 2.3%, 3% and 10%) as the dispersant, to give a range of sols with differing extents of flocculation. Subsequently, MIPA was added to take the pH to 8. The particles were then either left unwashed or were washed (to give a conductivity of <2 ms/cm). The sols were then spray dried using a LabPlant Super 7 laboratory spray dryer.

The dried samples were then analysed for surface area via the BET method and porosity by both mercury porosimetry and nitrogen isotherms.

|  | Citric Acid Level (%) | | | |
|---|---|---|---|---|
|  | 1 | 2.3 | 3 | 10 |
| Conductivity(ms/cm$^{-1}$) | 20.6 | 21.1 | 19.8 | 20.6 |
| BET SSA (m$^2$/g) | 177.8 | 179.9 | 136 | 75.4 |
| Mercury Large Pore Size (μm) | 2.599 | 1.9317 | 2.2885 | 1.5703 |
| Mercury Small Pore Size (nm) | 14.2 | 14.2 | 13.1 | 11.2 |
| Nitrogen Large Pore Size (nm) | 39.6 | 42.5 | 33.5 | 26.5 |
| Nitrogen Small Pore Size (nm) | 0.67 | 0.67 | 0.66 | 0.64 |
| Conductivity (ms/cm$^{-1}$) | <2 | <2 | <2 | <2 |
| BET SSA (m$^2$/g) | 248.8 | 254.1 | 258 | 239.6 |
| Mercury Large Pore Size (μm) | 1.8142 | 1.6069 | 1.59 | 1.9178 |
| Mercury Small Pore Size (nm) | 14.9 | 13.2 | 11.4 | 8.9 |
| Nitrogen Large Pore Size (nm) | 33.5 | 26.7 | 21.1 | 14.8 |
| Nitrogen Small Pore Size (nm) | 0.81 | 0.54 | 0.54 | 0.56 |

When lower amounts of dispersant were used, the isoelectric point was closer to the pH of the slurry. This resulted in the slurry being less dispersed.

It can be seen from the results that this use of lower amounts of dispersant (1% and 2.3%) leads to large surface areas, both in the washed and unwashed products. The use of lower amounts of dispersant (1% and 2.3%) also leads to larger pore sizes in the particles, both in the washed and unwashed products.

The porosity results show three distinct pore size regions:
>1 um=cavities between particles
5-20 nm=the pores within the particles (between the micelles)
~0.6 nm=pores within micelles.

The washing of the particles reduces the level of salt and therefore the conductivity. As the salt level (and therefore conductivity) is reduced, there are fewer charges present causing repulsion between particles and therefore the particles can pack together more closely. In addition, gaps are left behind that were previously filled by salts. This means that a higher surface area can be achieved.

In addition, the gelling behaviour of the sol appears to reduce when the conductivity is lowered, and higher concentrations of particles in the sol may be possible.

Example 6

A range of sols were prepared using a Blumenfeld process with a 70:30 drop ratio and a 10 minute drop time to give a modal micelle size of 23 nm. One sol was prepared in the standard method outlined in WO2011/033286. Another sol was doped with 10% WO$_3$ in the form of ammonium metatungstate at precipitation, and then processed according to the method outlined in WO2011/033286. A final sol was prepared with 10% silica added in the form of silicic acid; this was added after the peptisation stage, by passing sodium silicate through an ion exchange column to produce silicic acid, after this the sol was prepared as in WO2011/033286.

The sols were then spray dried using a Lab Plant Super 7 laboratory spray dryer.

Figure 4B:
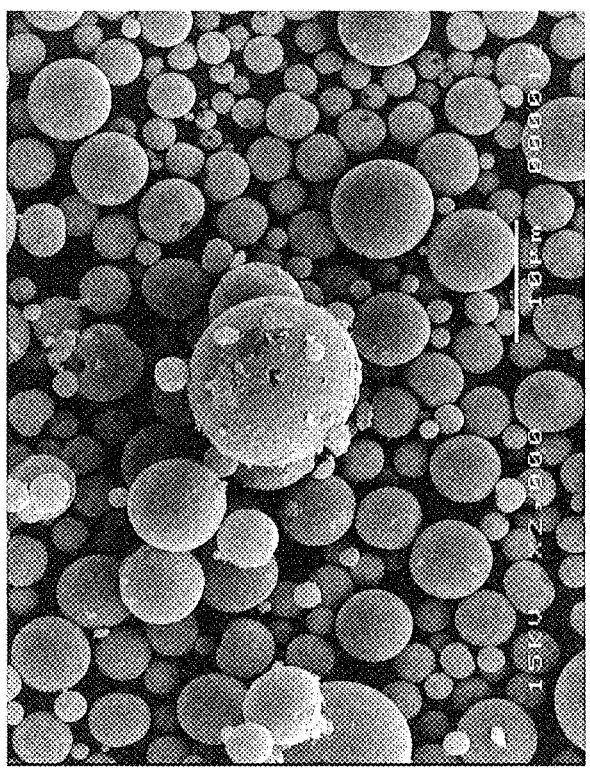
FIG. 4b is an image obtained by scanning electron microscopy (SEM) of the particles of the product obtained in Example 6 prepared using 10% $WO_3$ as a dopant.
Figure 4A:
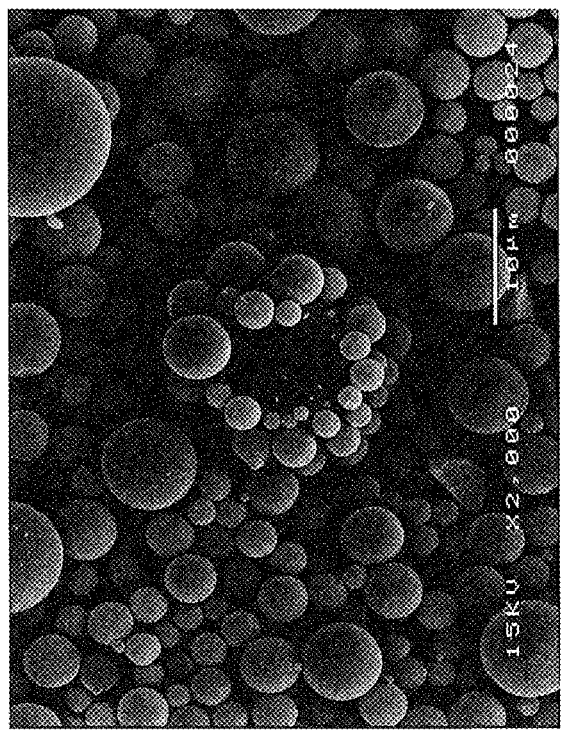
FIG. 4a is an image obtained by scanning electron microscopy (SEM) of the particles of the product obtained in Example 6 prepared using 15% silica as a dopant.
Figure 6B:
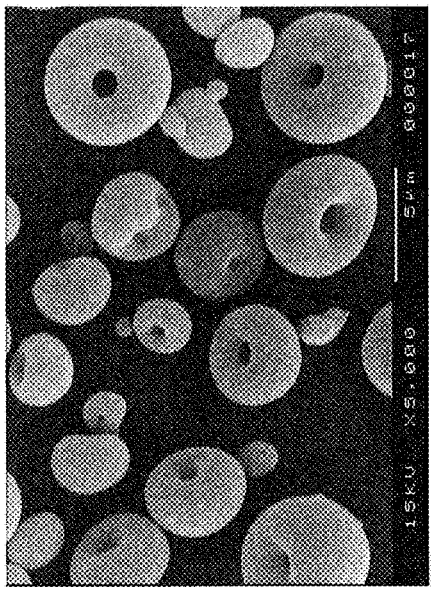
FIGS. 6a-6d are images obtained by scanning electron microscopy (SEM) of the particles of the dried products obtained in Example 7 for a sol having 10% solids at dryer inlet temperatures of 110° C., 150° C., 200° C., 250° C., respectively.
Figure 6D:
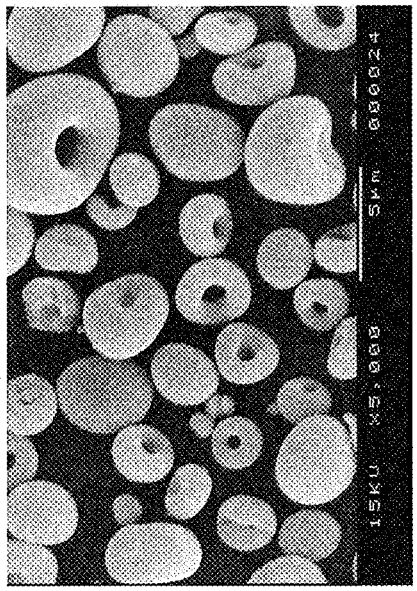
Figure 6A:
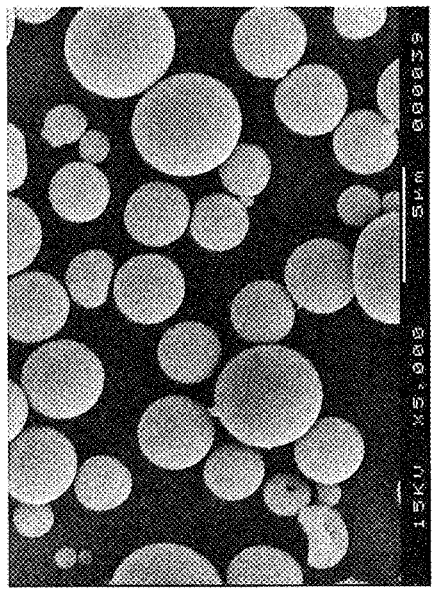
Figure 6C:
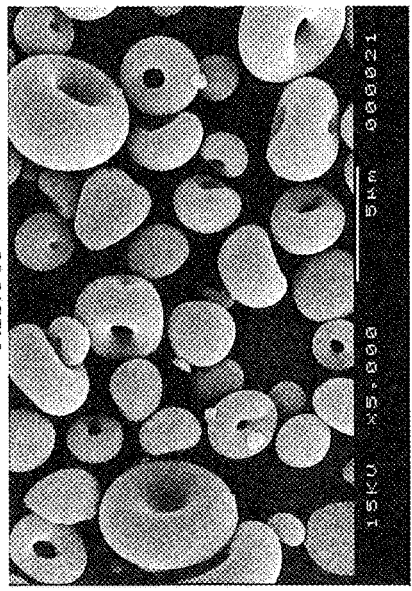

Scanning electron microscopy (SEM) was carried out to image the particles of the doped products obtained. The obtained images are shown in FIGS. 4a-b. FIG. 4a is 15% silica, FIG. 4b is 10% WO$_3$.

The spray dried porous titania samples were then calcined at 500° C. for 5 hours, 1 day, 3 days and 7 days. The specific surface areas of the calcined samples were then measured via the BET method.

|  | BET SSA after calcination at 500° C. (m$^2$/g) | | | | |
|---|---|---|---|---|---|
| Variant | Control | 5 hrs | 1 day | 3 days | 7 days |
| Standard | 301.3 | 84.8 | 77.7 | 70.5 | 65.3 |
| Std + 10% WO$_3$ | 257.7 | 113.6 | 112.5 | 102.0 | 100.4 |
| Std + 15% SiO$_2$ | 278.1 | 265.2 | 262.8 | 257.2 | 255.4 |

It can be seen that the use of dopants gives rise to improved thermal stability. In particular, the use of the SiO$_2$ dopant leads to a product where the particles are sufficiently stable to retain their large surface areas even after high temperature calcination for prolonged periods of time.

Example 7

A range of sols were prepared by the Mecklenberg method with a 6% nucleation level at precipitation. The sols were prepared in the standard way and the diluted to different levels to give sols at a range of solids content (1%, 10%, 17% & 25% wt/wt % solids).

The sols were then dried via a Lab Plant laboratory spray dryer, and particle size measured via the laser diffraction method using a Malvern Instruments Ltd MasterSizer instrument.

|  | Dryer Feed Concentration (wt/wt %) | | | |
|---|---|---|---|---|
|  | 1% | 10% | 17% | 25% |
| Particle Size (μm) Malvern | 3.05 | 6.75 | 8.59 | 10.17 |

Therefore it can be seen that particle size can be controlled by controlling the solids content of the spray dryer feed, with higher solids contents leading to larger particles.

The inlet temperature to the dryer was altered (110° C., 150° C., 200° C., 250° C.) to assess the effect of this drying temperature on sols with 1% solids, 10% solids and 17% solids.

Scanning electron microscopy (SEM) was carried out to image the particles of the dried products obtained. The obtained images are shown in FIGS. 5a-d (1% solids), FIGS. 6a-d (10% solids) and FIGS. 7a-d (17% solids).

In each case, image a is after drying at 110° C., image b is after drying at 150° C., image c is after drying at 200° C. and image d is after drying at 250° C.

Therefore it can be seen that particle shape can be controlled via the spray dryer inlet temperature. A lower inlet temperature gives more spherical particles (which can be hollow), whilst a higher temperature leads to the formation of toroidal (doughnut shaped) particles.

Example 8

A concentrated titania sol was obtained by precipitation that was carried out in accordance with the method of WO2011/033286.

The samples used were from a 6% nucleated Mecklenburg precipitation, that had been peptised to pH 1.5, addition with 10% citric acid, MIPA neutralised and CFF washed to <2 ms/cm.

The sol was spray dried using a laboratory scale Lab Plant Super 7 spray dryer, to form porous spherical particles. The sol was at a solids concentration of 17% wt/wt, and was spray dried at a temperature of 110° C.

The dried particles were then dispersed in water at a concentration of 100 g/l.

The resulting dispersion was then milled for 30 minutes using a high shear Silverson mixer. The particle size was measured using a Malvern Instruments Ltd MasterSizer laser diffraction instrument. Measurements were taken prior to milling (0 minutes), during milling (at 10 minutes and 20 minutes) and after milling (at 30 minutes).

|  | Milling time | | | |
| --- | --- | --- | --- | --- |
|  | 0 min | 10 min | 20 min | 30 min |
| d(v, 0.1) μm | 2.24 | 1.99 | 1.95 | 1.98 |
| d(v, 0.5) μm | 6.55 | 6.09 | 5.98 | 5.79 |
| d(4, 3) μm | 8.05 | 6.89 | 6.55 | 6.18 |
| d(v, 0.9) μm | 14.64 | 12.64 | 11.9 | 10.81 |
| Modal particle size μm | 7.99 | 7.15 | 7.13 | 7.02 |

This shows that the particles obtained are very stable under high shear forces.

The experiment was then repeated but with the spray dried particles being thermally treated at 500° C. for 7 days prior to milling, in order to assess whether the stability of the particles was still maintained after heat treatment.

Again, the particle size was measured using a Malvern Instruments Ltd MasterSizer laser diffraction instrument. Measurements were taken prior to milling (0 minutes), during milling (at 10 minutes and 20 minutes) and after milling (at 30 minutes).

|  | Milling time | | | |
| --- | --- | --- | --- | --- |
|  | 0 min | 10 min | 20 min | 30 min |
| d(v, 0.1) μm | 2.64 | 2.96 | 2.34 | 2.30 |
| d(v, 0.5) μm | 6.64 | 7.46 | 6.01 | 5.78 |
| d(4, 3) μm | 8.03 | 8.85 | 6.95 | 6.65 |
| d(v, 0.9) μm | 14.70 | 16.02 | 11.85 | 11.32 |
| Modal particle size μm | 7.92 | 9.16 | 7.05 | 6.94 |

It can be seen that the particles remain very stable under high shear forces even after heat treatment.

High shear mixing stability is important of a predictor of robustness and would indicate good resistance to mechanical stresses, including compressive forces such as those within catalyst installations. This robustness may, for example, be important in end uses relating to catalysis, and especially where extrusion of is required in the manufacture of the catalyst product, such as in SCR and combined SCR/DPF.

Example 9

Blaine data, comparing toroidal particles obtained by the invention and spherical particles obtained by the invention, was obtained by a test carried out according to BS4359: Part 2: 1982.

Both samples were obtained from example 7.

The toroidal sample was one that had been spray dried at a concentration of 10% wt/wt solids and spray dried at 250° C. (i.e. the product shown in FIG. 6d).

The spherical sample was one that had spray dried at a concentration of 10% wt/wt solids and spray dried at 110° C. (i.e. the product shown in FIG. 6a).

| Sample | Toroidal | Spherical |
| --- | --- | --- |
| Blaine Porosity | 0.720 | 0.688 |
| Blaine Test - cm$^2$/g | 21180 | 19869 |
| SG (Pycnometer) - g/cm$^3$ | 3.08 | 2.98 |

It can be seen that the toroidal particles obtained by the invention have improved porosity as compared to spherical particles obtained by the invention.

This shows that the process of the invention can be carried out in a manner to ensure that the toroidal shaped particles are obtained when end applications are envisaged that required good permeability. This may, for example, be the case in end uses such as SCR and combined SCR/DPF.

Example 10

Concentrated titania sol products were obtained by precipitation that was carried out in accordance with the method of WO2011/033286. These were obtained via the Blumenfeld method using various drop ratios. Each had a 10 minute drop time.

The micelle size of the titania sols were measured by CPS disc centrifuge particle size analyser.

Samples from each product were spray dried using a LabPlant SD-05 laboratory spray drier. The specific surface areas of each of the dried samples were tested using the BET method. The pore size was measured using mercury porosimetry, using a Micromeritics AutoPore IV porosimeter.

It was seen in these experiments that by altering the drop ratio, the micelle size can be controlled and in turn the pore size can be controlled. In this regard, as the drop ratio was raised from 70:30 up towards 90:10 the micelle size increased, the pore size increased, and the surface area decreased.

|  | Drop Ratio | |
| --- | --- | --- |
|  | 90:10 | 70:30 |
| Micelle size (nm) | 56.7 | 22.1 |
| Pore Size (nm) | 23.4 | 3.6 |
| SSA (m2/g) | 170.1 | 295.1 |

The results set out in the above table clearly illustrate that altering the drop ratio has a significant effect:changing the drop ratio from 90:10 to 70:30 decreases the micelle size by a factor of over 2.5, and thus gives rise to significantly smaller pore sizes and therefore larger specific surface area values.

Accordingly, a desired set of properties in the end product can be obtained by suitable control of the parameters in the process of manufacture of the titania. For example, if smaller pore sizes (and a higher SSA) is desired in the product, a lower drop ratio can be selected.

The invention claimed is:

1. A process for the production of titania particles, the process comprising:
   providing a titania sol;
   and
   drying the titania sol to provide dried titania particles,
   wherein, a morphology of the dried titania particles is controlled by applying one or more of the following criteria:

(a) the titania sol is produced from a TiO$_2$ containing slurry obtained using a precipitation step in a sulphate process, wherein the size of micelles formed during the precipitation is controlled, (b) the titania sol is produced from a TiO$_2$ containing slurry using a precipitation step in a sulphate process, and the iso-electric point of the titania is adjusted in order to affect the extent to which the titania sol is flocculated, (c) the titania sol is produced from a TiO$_2$ containing slurry using a precipitation step in a sulphate process, and the titania sol is dried by application of heat and the temperature used during the drying step is controlled, and wherein, the size of micelles formed during the precipitation is controlled by the use of (a) a Mecklenburg precipitation with a nucleation level in the range of from 0.1 to 15 wt %, or (b) a Blumenfeld precipitation with a drop ratio of from 50:50 to 99:1.

2. The process of claim 1, wherein the pore size of the dried titania particles is controlled by applying one or more of the following criteria:

(A-i) the titania sol is produced from a TiO$_2$ containing slurry obtained using a precipitation step in a sulphate process, and the size of micelles formed during the precipitation is controlled, (A-ii) the titania sol is produced from a TiO$_2$ containing slurry and the iso-electric point of the titania is adjusted in order to affect the extent to which the titania sol is flocculated.

3. The process of claim 1, wherein the shape of the dried titania particles is controlled by applying the following criteria:

(B-i) the titania sol is dried by application of heat and the temperature used during the drying step is controlled.

4. The process of claim 1, wherein two or more of the criteria (a) to (c) are applied.

5. The process of claim 1, wherein all three of the criteria (a) to (c) are applied.

6. The process of claim 1, wherein all three of the criteria (a) to (c) are applied and the morphology of the dried titania particles is further controlled by also applying the following criteria:

(d) the titania sol is produced from a TiO$_2$ containing slurry and the pH of the slurry is controlled in order to affect the extent to which the titania sol is flocculated.

7. The process of claim 1, wherein one or more active catalytic components are incorporated during the production of the titania particles.

8. The process of claim 1, wherein one or more thermal stabilizer components are incorporated during the production of the titania particles.

9. A process for the production of titania particles, wherein the process comprises:

providing a titania sol; and spray drying the titania sol to provide dried titania particles, wherein, a morphology of the dried titania particles is controlled by:

producing the titania sol from a TiO$_2$ containing slurry obtained using a precipitation step in a sulphate process and adjusting the iso-electric point to be 3 pH units or more from the pH of the slurry, by the addition of dispersant, in order to reduce the extent to which the titania sol is flocculated, and wherein, a size of micelles formed during the precipitation is controlled by the use of (a) a Mecklenburg precipitation with a nucleation level in the range of from 0.1 to 15 wt %, or (b) a Blumenfeld precipitation with a drop ratio of from 50:50 to 99:1.

10. The process of claim 9, wherein the iso-electric point of the titania is adjusted to be 4 pH units or more from the pH of the slurry by the addition of dispersant, in order to reduce the extent to which the titania sol is flocculated.

11. The process of claim 9, wherein the morphology of the dried titania particles is further controlled by the temperature used during the spray drying step being controlled.

* * * * *